US012729541B2

(12) United States Patent
Baltz, Jr.

(10) Patent No.: US 12,729,541 B2
(45) **Date of Patent: *Sep. 8, 2026**

(54) SELF-ADHERING BEAD DEVICE

(71) Applicant: Alabama Metal Industries Corporation, Birmingham, AL (US)

(72) Inventor: Gary George Baltz, Jr., Mountain Brook, AL (US)

(73) Assignee: Alabama Metal Industries Corporation, Birmingham, AL (US)

( * ) Notice: Subject to any disclaimer, the term of this patent is extended or adjusted under 35 U.S.C. 154(b) by 635 days.

This patent is subject to a terminal disclaimer.

(21) Appl. No.: 18/318,087

(22) Filed: May 16, 2023

(65) Prior Publication Data

US 2023/0374791 A1 Nov. 23, 2023

Related U.S. Application Data

(60) Provisional application No. 63/364,833, filed on May 17, 2022.

(51) Int. Cl.
*E04F 13/06* (2006.01)
*E04F 19/06* (2006.01)
(Continued)

(52) U.S. Cl.
CPC ................ *E04F 13/06* (2013.01); *E06B 1/68* (2013.01); *E04F 2013/063* (2013.01); *E04F 19/061* (2013.01); *E06B 1/62* (2013.01)

(58) Field of Classification Search
CPC ... E04F 13/06; E04F 2013/063; E04F 19/061; E06B 1/68; E06B 1/62; E06B 2001/624
(Continued)

(56) References Cited

U.S. PATENT DOCUMENTS

| | | | |
|---|---|---|---|
| D26,201 S | 10/1896 | Turner | |
| 1,170,968 A | 2/1916 | Elgin | |

(Continued)

FOREIGN PATENT DOCUMENTS

| | | |
|---|---|---|
| CA | 165350 S | 8/2016 |
| CA | 165351 S | 8/2016 |

(Continued)

OTHER PUBLICATIONS

Archive.org: Carroll's Building Materials—E-Z Bead™ Stucco Casing Bead (Estimated publication Jun. 4, 2016, https://web.archive.org/web/20160604082708/https://carrollsbuildingmaterials.com/build ing-materials/stucco-lath-vinly-products/e-z-bead-stucco-casing-bead/.

(Continued)

*Primary Examiner* — Phi D A
(74) *Attorney, Agent, or Firm* — HONIGMAN LLP; Eric J. Sosenko

(57) ABSTRACT

A casing bead includes a base panel that, with the casing bead mounted at a vertical wall structure, is disposed along the vertical wall structure. A stop bead wall extends from an edge region of the base panel and includes a first side facing the base panel, an opposite second side and a flange extending from the first side and partially over the base panel. A flexible spacing element is disposed at the second side of the stop bead wall and includes a surface spaced from the second side by a pair of side walls. With the casing bead mounted at the vertical wall structure, an adhesive element at the surface of the flexible spacing element engages a structure adjacent the vertical wall structure to attach the casing bead at the structure. In response to expansion of the structure, the flexible spacing element is compressed toward the stop bead wall.

23 Claims, 38 Drawing Sheets

(51) Int. Cl.
*E06B 1/62* (2006.01)
*E06B 1/68* (2006.01)

(58) Field of Classification Search
USPC ........................................................ 52/396.03
See application file for complete search history.

(56) References Cited

U.S. PATENT DOCUMENTS

| | | | | |
|---|---|---|---|---|
| 1,204,955 | A | 11/1916 | Day | |
| 2,151,605 | A | 3/1939 | Lavering | |
| 2,272,762 | A | 2/1942 | Awbrey | |
| D151,022 | S | 9/1948 | Weber et al. | |
| 3,375,623 | A | 4/1968 | Buhler | |
| 3,383,818 | A | 5/1968 | Tatum | |
| 3,606,714 | A | 9/1971 | Arnett | |
| 3,667,174 | A | 6/1972 | Arnett | |
| 3,754,367 | A | 8/1973 | O'Konski et al. | |
| 3,964,220 | A | 6/1976 | Rutkowski et al. | |
| 4,184,298 | A * | 1/1980 | Balzer | E04B 1/6804 14/73.1 |
| 4,624,087 | A | 11/1986 | Schneller | |
| 4,651,488 | A | 3/1987 | Nicholas et al. | |
| 4,785,601 | A | 11/1988 | Tupman | |
| D299,963 | S | 2/1989 | Callahan | |
| 5,063,720 | A | 11/1991 | Bifano et al. | |
| 5,263,294 | A | 11/1993 | Koenig et al. | |
| D344,596 | S | 2/1994 | McArthur | |
| 5,423,154 | A | 6/1995 | Maylon et al. | |
| 5,579,617 | A | 12/1996 | Schiedegger | |
| 5,579,623 | A | 12/1996 | Stark et al. | |
| 5,761,866 | A | 6/1998 | Maylon | |
| 5,765,332 | A * | 6/1998 | Landin | E04B 1/948 52/235 |
| 5,791,111 | A * | 8/1998 | Beenders | E01D 19/06 404/69 |
| 6,338,229 | B1 | 1/2002 | Botzen | |
| D456,528 | S | 4/2002 | Maylon et al. | |
| D459,007 | S | 6/2002 | Campacci | |
| D471,991 | S | 3/2003 | Maylon et al. | |
| D477,420 | S | 7/2003 | Butcher | |
| 6,609,341 | B2 | 8/2003 | Maylon et al. | |
| 6,854,737 | B2 * | 2/2005 | Fieger | E01D 19/06 277/630 |
| 7,406,805 | B1 | 8/2008 | Larson | |
| 7,634,883 | B1 | 12/2009 | Larson | |
| D672,473 | S | 12/2012 | Chapman | |
| 8,584,416 | B2 | 11/2013 | Chenier | |
| 8,615,944 | B2 | 12/2013 | Maziarz | |
| D700,717 | S | 3/2014 | Campacci | |
| D703,306 | S | 4/2014 | Little | |
| D703,307 | S | 4/2014 | Little | |
| D740,969 | S | 10/2015 | Di Marzio | |
| D750,809 | S | 3/2016 | Shaw | |
| 9,279,247 | B2 | 3/2016 | Maziarz | |
| D761,971 | S * | 7/2016 | Apanovich | D25/119 |
| D762,310 | S * | 7/2016 | Apanovich | D25/119 |
| D787,091 | S | 5/2017 | Singh | |
| D797,956 | S | 9/2017 | Shaw | |
| D800,344 | S | 10/2017 | Apanovich | |
| D800,921 | S | 10/2017 | Apanovich | |
| D815,757 | S | 4/2018 | Braun | |
| D835,813 | S | 12/2018 | Lee | |
| D842,496 | S | 3/2019 | Apanovich | |
| D861,196 | S | 9/2019 | Apanovich | |
| D872,905 | S | 1/2020 | Jones | |
| 10,655,336 | B2 | 5/2020 | Friel | |
| D904,645 | S | 12/2020 | Reed | |
| D904,646 | S | 12/2020 | Reed | |
| 10,947,722 | B2 | 3/2021 | Baltz, Jr. et al. | |
| D923,821 | S | 6/2021 | Baltz, Jr. et al. | |
| 11,091,921 | B2 * | 8/2021 | Maziarz | E04F 19/061 |
| D940,349 | S | 1/2022 | Baltz, Jr. et al. | |
| D940,350 | S | 1/2022 | Baltz, Jr. et al. | |
| D943,776 | S | 2/2022 | Baltz, Jr. | |
| D973,913 | S | 12/2022 | Baltz, Jr. et al. | |
| 11,566,664 | B2 | 1/2023 | Lima et al. | |
| D989,867 | S | 6/2023 | Eden | |
| 12,006,704 | B1 * | 6/2024 | Guevara | E04F 21/0053 |
| 2004/0020143 | A1 * | 2/2004 | Webb | E06B 5/10 52/287.1 |
| 2005/0115189 | A1 | 6/2005 | Leffler | |
| 2008/0104918 | A1 | 5/2008 | Gleeson | |
| 2008/0148672 | A1 | 6/2008 | Monteer | |
| 2008/0263971 | A1 | 10/2008 | Maziarz | |
| 2009/0183453 | A1 | 7/2009 | Koessler | |
| 2013/0104481 | A1 | 5/2013 | Urban, Jr. et al. | |
| 2016/0340908 | A1 | 11/2016 | Apanovich | |
| 2017/0130462 | A1 | 5/2017 | Maziarz | |
| 2017/0254091 | A1 | 9/2017 | Friel | |
| 2018/0112414 | A1 | 4/2018 | Maziarz | |
| 2019/0136549 | A1 | 5/2019 | Maziarz | |
| 2019/0161960 | A1 | 5/2019 | Baltz, Jr. | |
| 2019/0194954 | A1 | 6/2019 | Baltz, Jr. | |
| 2019/0292791 | A1 | 9/2019 | Friel | |
| 2020/0063432 | A1 | 2/2020 | Baltz, Jr. | |
| 2020/0063446 | A1 | 2/2020 | Baltz, Jr. | |
| 2020/0240153 | A1 | 7/2020 | Maziarz | |
| 2021/0180335 | A1 | 6/2021 | Maziarz | |
| 2022/0205250 | A1 | 6/2022 | Baltz, Jr. | |

FOREIGN PATENT DOCUMENTS

| | | | | |
|---|---|---|---|---|
| DE | 102007009945 | A1 * | 9/2008 | E06B 1/62 |
| EP | 3015619 | A1 * | 5/2016 | E06B 1/68 |

OTHER PUBLICATIONS

Salmon Bay Sand & Gravel Company—Image Library (Estimated publication Aug. 2017), https://www.sbsg.com/wp-content/uploads/2017/08/VCorp-BackerBead-Profile.png.

Ultra Casing Bead Saves Time, Seals Tight, available in website.com, announced Apr. 7, 2022 [online], [site visited Feb. 13, 2024], Internet URL: https://www.wconline.com/articles/94178-ultra-casing-bead-saves-time-seals-tight <http://www.wconline.com/articles/94178-ultra-casing-bead-saves-time-seals-tight> (Year: 2022).

Ultra Casing bead, announced in YouTube on Jul. 30, 2020 [online], [site visited Feb. 13, 2024], Available from the internet URL: https://www.youtube.com/watch?v=Ve6QzS246t8 <http://www.youtube.com/watch?v=Ve6QzS246t8> (Year: 2020).

Ultra Casing Bead, available in facebook.com, date first available Oct. 28, 2020 [online], [site visited Feb. 13, 2024], Available from the internet URL: https://www.facebook.com/PlasticComponentsInc/photos/a.17 <http://www.facebook.com/PlasticComponentsInc/photos/a.17> 4702274568/10160670320139569/ (Year: 2020).

* cited by examiner

SELF-ADHERING BEAD DEVICE

CROSS REFERENCE TO RELATED APPLICATION

The present application claims the filing benefits of U.S. provisional application Ser. No. 63/364,833, filed May 17, 2022, which is hereby incorporated herein by reference in its entirety.

FIELD OF THE INVENTION

The present invention relates to casing beads. Specifically, the present invention relates to a stop system used at a terminal edge of a wall surface, such as an adjoining frame for a window or door or an upper edge region of a wall or at a junction between sections of wall.

BACKGROUND OF THE INVENTION

Stucco, plaster and other applied surface materials, such as vinyl siding or stone veneer, are typically used for both interior and exterior surfaces in home or commercial building construction. For example, stucco or plaster is routinely applied to a galvanized wire mesh over felt paper which has been attached to underlying plywood or other sheathing material. In order to provide a smooth edge where the surface material meets a door or window jamb or frame, it is known to provide a barrier or border to define the edge of the surface material. However, traditional methods of providing the barrier are time consuming, expensive, prone to moisture leakage at the juncture, and may result in uneven or non-uniform edges of the surface material.

SUMMARY OF THE INVENTION

The present invention includes a self-adhering casing bead that is easier to install, does not require backer rod or caulking, and provides for quick, efficient and lower cost installation of stucco and/or plaster and reduces or eliminates the potential for leaks around windows and doors.

A self-adhering casing bead provides for quick, efficient and lower cost installation of surface materials, such as vinyl siding, stone veneer, stucco and/or plaster and reduces or eliminates the potential for leaks around wall elements such as windows and doors. A self-adhering casing bead may be used as a stop between the edge of the surface material and the adjacent jamb or window/door frame. A flexible area of the casing bead helps to seal the juncture between the surface material and the wall element and acts as a gasket to preclude water intrusion. The distance between the edge of the surface material and the adjacent wall element is also greatly reduced because caulking is not required.

For example, a self-adhering casing bead may include a base panel that, with the casing bead mounted at a vertical wall structure, is disposed along the vertical wall structure. A stop bead wall extends from an edge of the base panel and the stop bead wall includes a first side facing the base panel and a second side opposite the first side. A flange extends from the first side of the stop bead wall and extends partially over the base panel. A flexible spacing element is disposed at the second side of the stop bead wall. The flexible spacing element includes a surface spaced from the second side of the stop bead wall by a pair of side walls of the flexible spacing element. An adhesive element is disposed at the surface of the flexible spacing element. With the casing bead mounted at the vertical wall structure, the adhesive element engages a surface perpendicular to the vertical wall structure to adhesively attach the casing bead at the surface. With the casing bead attached at the surface, the flexible spacing element is disposed between the stop bead wall and the surface and, responsive to an expansion of the surface, the flexible spacing element is compressed towards the stop bead wall.

These and other objects, advantages, purposes and features of the present invention will become apparent upon review of the following specification in conjunction with the drawings.

DESCRIPTION OF THE PREFERRED EMBODIMENTS

As described herein, the self-adhering casing bead significantly reduces the time and costs necessary to install smooth finishes where wall surface materials, such as stucco or plaster, meet the edges of the wall, such as at wall elements adjacent to the wall surface like window or door frames or jambs. The self-adhering casing bead may also be installed at the edges of other interior and exterior wall surfaces, such as at the edges of vinyl siding or stone veneer.

Figure 1:
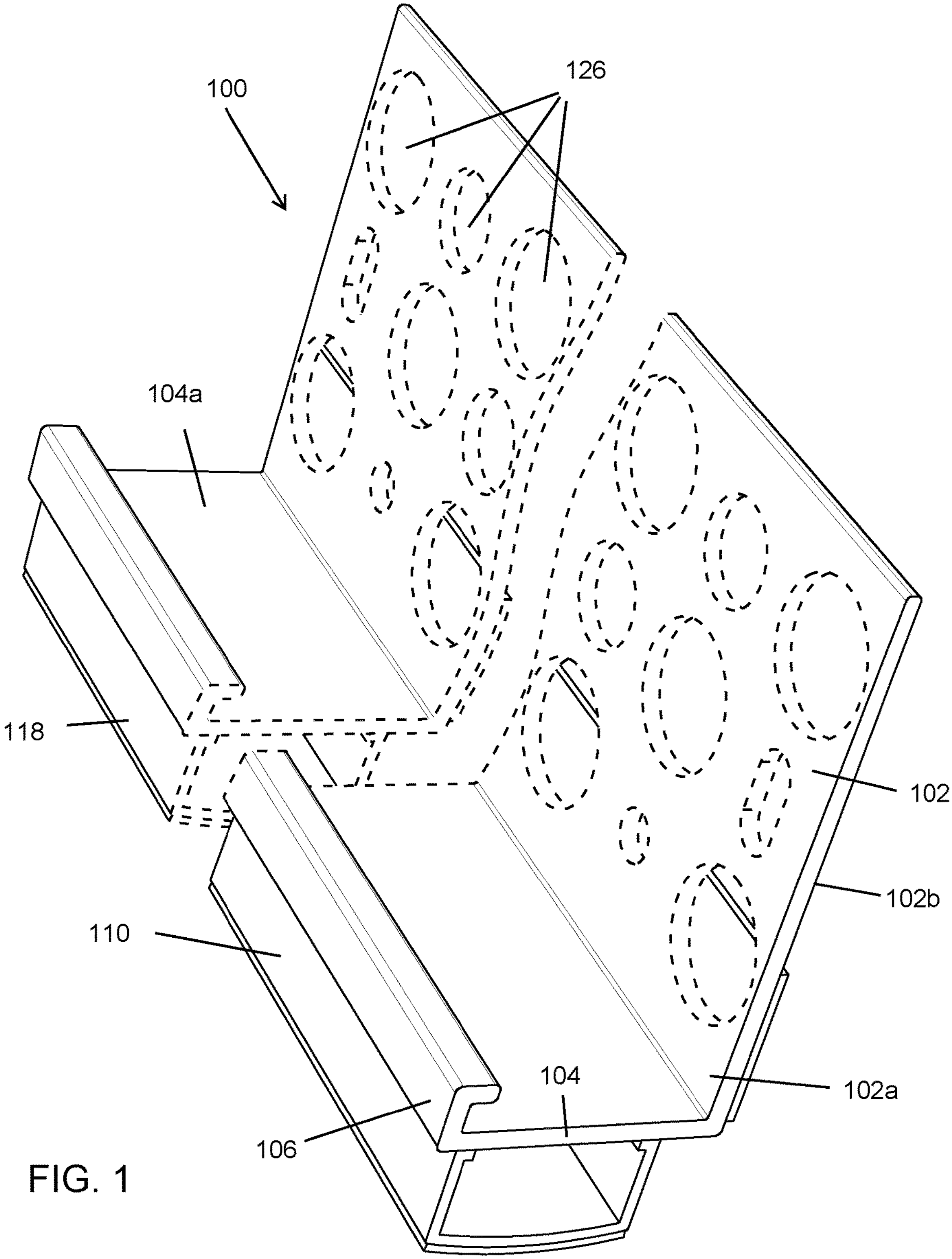
FIG. 1 is a perspective view of a self-adhering casing bead.
Figure 2:
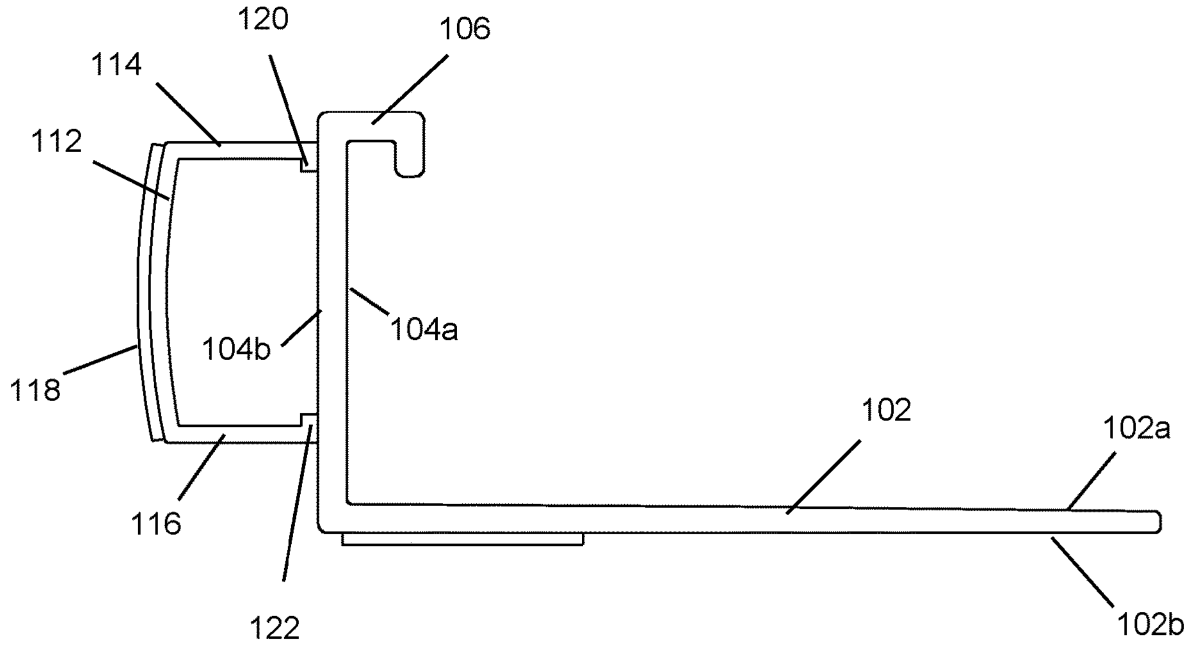
FIGS. 2-7 are side views of the self-adhering casing bead of FIG. 1.
Figure 3:
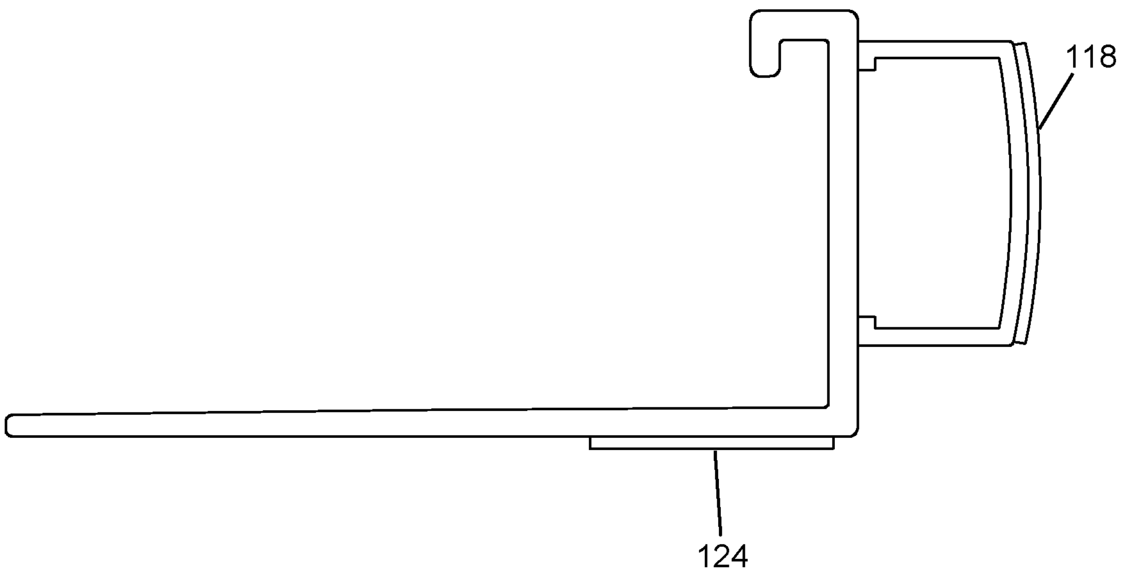
Figure 4:
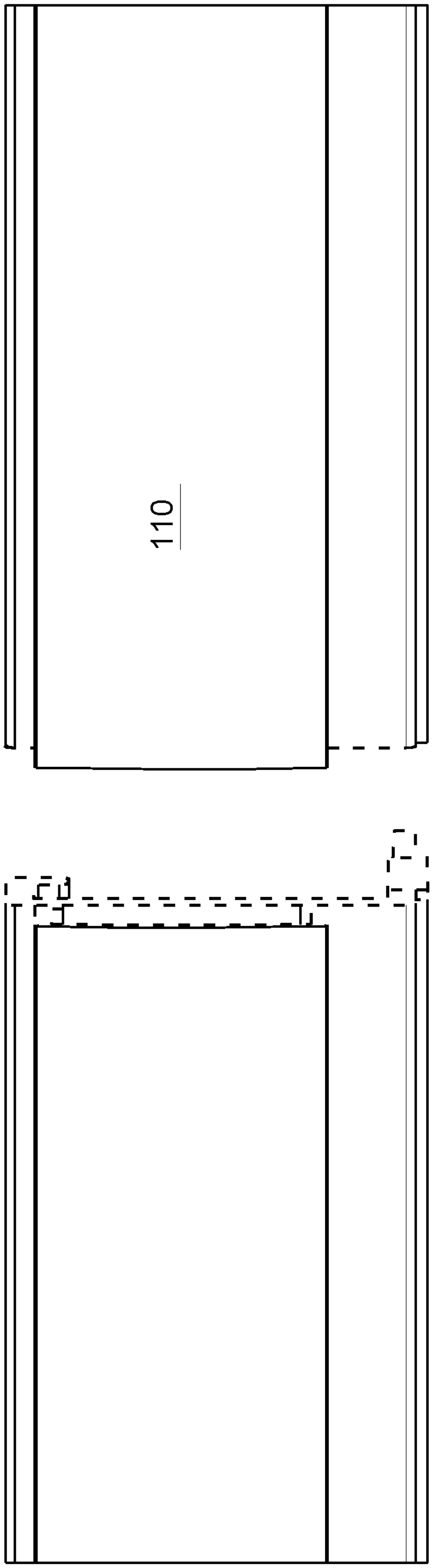
Figure 5:
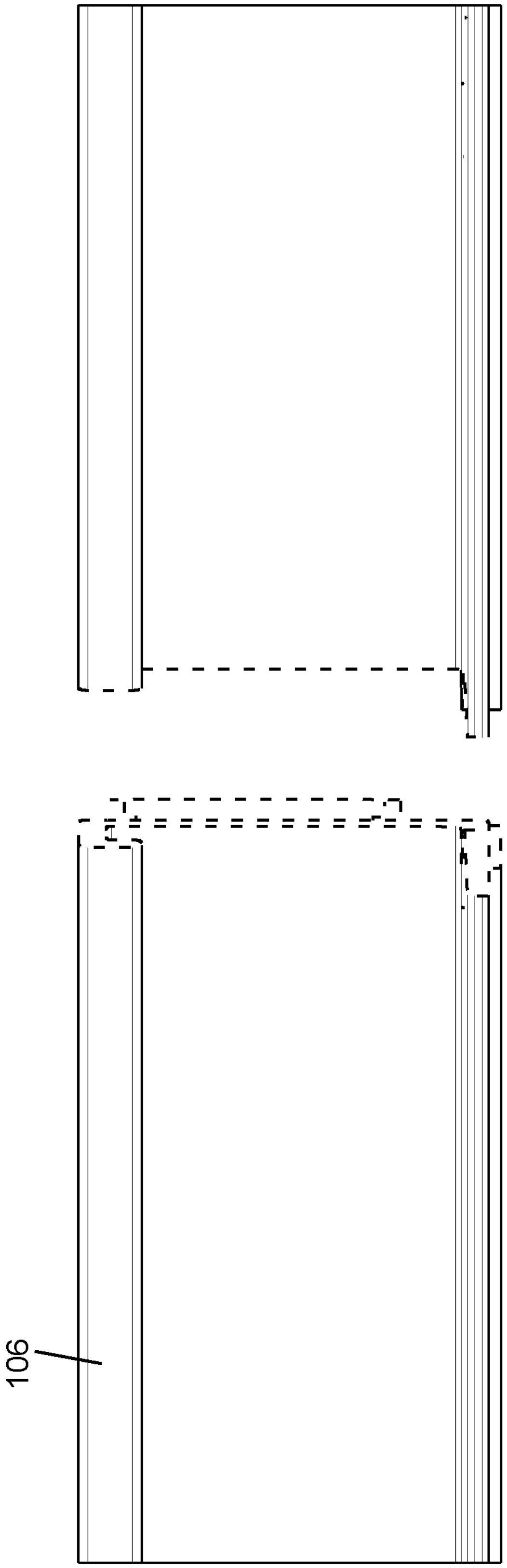

Referring now to the drawings and the illustrated embodiments depicted therein, the self-adhering casing bead 100 includes a spacing member 110 disposed at a stop bead wall 104 of the casing bead 100, where the spacing member 110 is configured to engage the adjacent wall element or edge to provide a uniform spacing along the casing bead 100 between the wall surface material and the adjacent wall element (FIGS. 1 and 2). The spacing member 110 may be flexible or compressible to accommodate expansion and contraction of the adjacent wall element, such as due to changes in humidity or temperature. For example, the spacing member 110 may include a convex surface 112 spaced from the stop bead wall 104 and that flexes or compresses towards the stop bead wall 104 to accommodate the changes in the wall element. The self-adhering casing bead 100 also includes at least one adhesive member 118 disposed at the spacing member 110 so that the casing bead 100 may adhere to the wall and/or adjacent wall element when the casing bead 100 is disposed at the wall. This reduces installation time as the casing bead 100 may quickly be pressed into alignment with the wall element and caulking or sealant is not required at the junction between the casing bead 100 and the wall element.

The casing bead 100 is configured to receive a wall surface material (e.g., stucco, plaster, vinyl siding, stone veneer, or the like) at a base panel 102 and stop bead wall 104 to form an edge of the surface material at the stop bead wall 104. The stop bead wall 104 is spaced from an adjacent wall element (e.g., window frame or door jamb) by the spacing member 110 disposed along a side of the stop bead wall 104 opposite from the side of the stop bead wall 104 that receives the surface material. The spacing member 110 provides a uniform edge of the surface material along the stop bead wall 104 so that, for example, a uniform strip of sealant or caulk may be placed along the spacing member 110 and between the edge of the wall element and the top of the stop bead wall 104. The spacing member 110 (and/or at least a portion of the stop bead wall and/or base panel) may include the adhesive member or element 118 for adhering the casing bead 100 to the wall and/or wall element when the spacing member 110 and adhesive element 118 are engaged with or pressed against the wall and/or wall element. The spacing member 110 may include a flexible construction so that when the casing bead 100 is engaged with the wall member, the spacing member 110 may accommodate expansion and contraction of the wall element without disturbing (e.g., transferring the compression forces to) the surface material. The self-adhering casing bead may include characteristics of the casing beads described in U.S. Pat. No. 9,279,247 and/or U.S. Publication No. US-2022-0205250, which are hereby incorporated herein by reference in their entireties.

In building construction, exterior and interior surfaces are often made of stucco, plaster, vinyl siding, or adhered stone. The method of installation of these materials involves the installation of a felt layer over the backing wall (plywood or similar material), a galvanized wire (or lathe) layer, and both scratch and finish coats of stucco or plaster. Such construction occurs in layers. A wire mesh layer of galvanized wire is anchored over felt paper to the backing wall (usually plywood or a similar material). Scratch and finish coats of plaster or stucco are applied to the wire layer. Where the stucco or plaster meets a window or door jamb or another surface, the casing bead may be attached to the backing wall behind or adjacent to the galvanized wire layer. In other words, at the junction of the window or door jamb with the wall, the felt paper may be applied over the backing wall, with the casing bead disposed between the felt paper and the wire mesh layer disposed over the felt paper. Optionally, the casing bead is disposed over the wire mesh layer. The one or more coats of finishing material (e.g., scratch and finish coats of plaster or stucco) are then applied over the wire mesh layer and the casing bead, with the casing bead defining an edge of the wall material at the window or door jamb. The edge of the casing bead closest to the jamb and the flange extending therefrom may be raised relative to the wall element to contain the stucco or plaster and keep it away from the jamb or frame. Without the casing bead (and optionally sealant) disposed between the edge of the surface material and the adjacent wall element, leaking and other problems may occur where the stucco, adhered stone (mortar) or plaster finish aligns with other design constructs of the home or building, such as windows, soffits or doors.

As shown in FIGS. 1-7, the casing bead 100 includes the base panel 102, and the stop bead wall 104 is formed with the base panel 102 and extends from (and generally normal to) a front or first face 102*a* of the base panel 102. A flange 106 extends from the stop bead wall 104 above the front face 102*a* of the base panel 102. The spacing member 110 is disposed at and along a second side 104*b* of the stop bead wall 104 and includes the surface or wall 112 spaced from the stop bead wall 104 by opposite side walls or support arms 114, 116.

The plaster or stucco or other suitable surface material is applied over the front face 102*a* of the base panel 102 after the casing bead 100 is mounted adjacent the window frame or door jamb or other suitable wall element. The base panel 102 has perforations formed therein, such as to provide holes through which nails or other retaining elements may affix the casing bead 100 to the wall or so that stucco or plaster may be received therethrough to further retain the casing bead 100 at the wall. The base panel 102 also includes a rear or second face 102*b* opposite the front face 102*a* and that faces the wall when the casing bead 100 is disposed at the wall.

The stop bead wall 104 is formed on the base panel 102 and extends outwardly above the front face 102*a* of the base panel 102 from an edge of the base panel 102. The stop bead wall 104 includes a first side or surface 104*a* that receives the surface material and the opposite second side or surface 104*b* that faces the wall element. The flange 106 at the top or outer end of the stop bead wall 104 may extend over the base panel 102 and receive the surface material to provide a uniform edge and to prevent the surface material from flowing above or over or around the top end of the stop bead wall 104. Optionally, the flange 106 is substantially J-shaped or includes a return portion that extends from the flange 106 and toward the base panel 102.

The spacing member 110 is formed on the stop bead wall 104 and extends outwardly away from the second side 104*b* that faces the wall element. The spacing member 110 may be dimensioned to define the width of the gap between the stop bead wall 104 and adjacent wall element when the casing bead 100 is positioned at the wall. For example, the spacing member 110 may be configured to provide a required gap surrounding electrical outlets at the wall. The spacing member 110 includes an adhesive element 118 along an outer surface of the wall 112 that is configured to adhesively attach the casing bead 100 to the wall element and the spacing member 110 is configured to flex or compress responsive to expansion and contraction of the window element (such as due to temperature or humidity changes). For example, the spacing member 110 may comprise a flexible or deformable material, such as a flexible exterior grade vinyl or flexible metal or a foam or the like (or any other suitable material, such as a rubber material, gasket material, PLA (polylactic acid) material, stiff vinyl material or the like).

The surface 112 of the spacing member 110 may comprise any suitable shape or configuration, such as a convex surface, a concave surface, a flat surface, or the like. For example, and as shown in FIGS. 1-7, the surface or wall 112 comprises a convex wall 112 that curves at least partially outward from the stop bead wall 104 and toward the wall element. The spacing member 110 has a hollow construction and is attached to or extends from the stop bead wall 104 via the pair of side walls or support arms, referred to as an outer or first side wall or support arm 114 and an inner or second side wall or support arm 116. The wall 112 is integrally formed with the support arms and spaced from the stop bead wall 104 via the support arms, and the spacing member 110 may be integrally formed with, or extruded from, the stop bead wall 104 or may be separately attached thereat. For example, the base panel 102, stop bead wall 104 and flange 106 may be formed (such as integrally formed as a unitary component) and the spacing member 110 may be attached to the stop bead wall 104 such as via adhesive or heat welding. The convex wall 112 may compress into the hollow space of the spacing member 110 and toward the stop bead wall 104 to accommodate expansion of the wall element and/or one or more of the support arms 114, 116 may bend or flex to accommodate the expansion.

The first and second support arms 114, 116 have respective outer surfaces and respective inner surfaces, the inner surfaces defining a hollow or space between the second side 104*b* of the stop bead wall and an inner surface of the convex wall 112. The first and second support arms 114, 116 extend from the second side 104*b* of the stop bead wall 104 and are substantially perpendicular with the stop bead wall 104. At the contact point between the stop bead wall and the spacing member, a first foot or leg 120 at the first support arm 114 and a second foot or leg 122 at the second support arm 116 may be integrally formed with the respective support arms, such as to increase the contact surface between the spacing member 110 and the stop bead wall 104 and/or decrease the flexibility of the support arms near the stop bead wall 104. Thus, the respective feet 120, 122 connecting or attaching the respective legs 114, 116 at the stop bead wall 104 may provide rigid support for the spacing member 110 from the movement of wall element to promote flexing of the respective legs 114, 116 when the wall element expands toward the stop bead wall 104.

The spacing member 110 is disposed along the stop bead wall 104 with the outer surface of the first support arm 114 offset from the top of the stop bead wall 104 (such as by 3/16 of an inch) so that, when the casing bead 100 is disposed at a wall against a jamb, caulk or sealant material may not be necessary to provide a full and reliable seal between the wall and the jamb near the surface of the wall. However, the outer surface of the first support arm 114 may be configured to receive caulk or a sealant material, such as via a non-adhesive layer or coating, such as bond-breaking tape, disposed thereat to further improve retention of the casing bead 100 and decrease the chance of leaks at the wall element. The spacing member 110 is offset so that caulk or sealant disposed at the outer surface of the first support arm 114 may be at least partially recessed from or generally coplanar with the outer end of the stop bead wall 104 and the flange 106.

The adhesive member 118 (such as an adhesive strip or foam or tape such as double sided tape) may be disposed at the spacing member 110 so that when the casing bead 100 is installed at a vertical wall and/or horizontal surface perpendicular to the vertical wall (such as door or window jamb at the wall), the adhesive member 118 may engage the vertical wall and/or horizontal surface to retain the casing bead 100 at the wall and/or jamb at which the casing bead 100 is being installed. For example, the adhesive member 118 may include an adhesive foam adhered to the spacing member 110, such as via a secondary adhesive or glue. The adhesive member 118 may be disposed at the spacing member 110 at any suitable time before the casing bead is installed at the wall structure. For example, the adhesive member 118 may be disposed at the spacing member 110 during the manufacturing process (and may be formed with the casing bead or attached to the formed casing bead) or the adhesive member 118 may be disposed at the spacing member 110 immediately prior to installing the casing bead at the wall structure. For example, a user may attach double sided tape to the spacing member 110 and then attach the casing bead to a window jamb.

The casing bead 100 may be installed so that the base panel 102 is disposed along the wall or vertical wall structure and the spacing member 110 (and more particularly the convex surface or wall 112 of the spacing member 110) abuts the horizontal surface of the jamb perpendicular to the vertical wall structure. The adhesive member 118 may be disposed at the wall 112 of the spacing member 110 so as to engage the jamb when the casing bead 100 is installed. The adhesive member 118 may be at least partially conformable or flexible or compressible so that, no matter the configuration or flexible orientation of the spacing member 110, the adhesive member 118 attaches the casing bead to the jamb. In other words, with the adhesive member 118 attaching the flexible wall 112 of the spacing member 110 to the wall element, the adhesive member 118 maintains attachment of the flexible wall 112 to the wall element as the wall element expands and/or contracts and the spacing member 110 flexes to accommodate the movement of the wall element. Thus, the adhesive member 118 engages the surface of the jamb and conforms to the jamb to secure the casing bead at the jamb.

Surface material (e.g., vinyl siding, stone veneer, plaster, stucco, or the like) covers the base panel 102 and is retained via the stop bead wall 104 and flange 106. As the jamb expands (such as due to temperature changes), the jamb expands against the spacing member 110, which flexes to accommodate the expansion of the jamb. The adhesive strip or member 118 at the convex surface of the spacing member maintains the contact or attachment between the spacing member 110 and the jamb as the jamb expands against the spacing member 110 and contracts away from the spacing member 110.

Additionally, one or more adhesive members 124 may be disposed at the rear face 102*b* of the base panel 102 to retain the base panel 102 at a portion of the wall at which the casing bead 100 is being installed. The adhesive strip 124 at the base panel 102 helps to hold the base panel in place at the wall to which the casing bead 100 is being installed. For example, the adhesive strips 124 may retain the base panel 102 at a layer of the pre-finished wall (e.g., at the felt paper) prior to a nail being driven through the base panel 102 (e.g., through an aperture formed through the base panel) and prior to the stucco or plaster being placed over the base panel 102. Installation of the casing bead 100 at the wall via the one or more adhesive members 118, 124 at the spacing member 110 and base panel 102 may also eliminate the requirement of driving a nail through the base panel 102. The adhesive member 124 may be disposed at any suitable location on the rear face of the base panel 102, such as at an end of the base panel 102 at or near the stop bead wall 104 and/or the opposite end of the base panel 102 distal from the stop bead wall 104.

Figure 6:
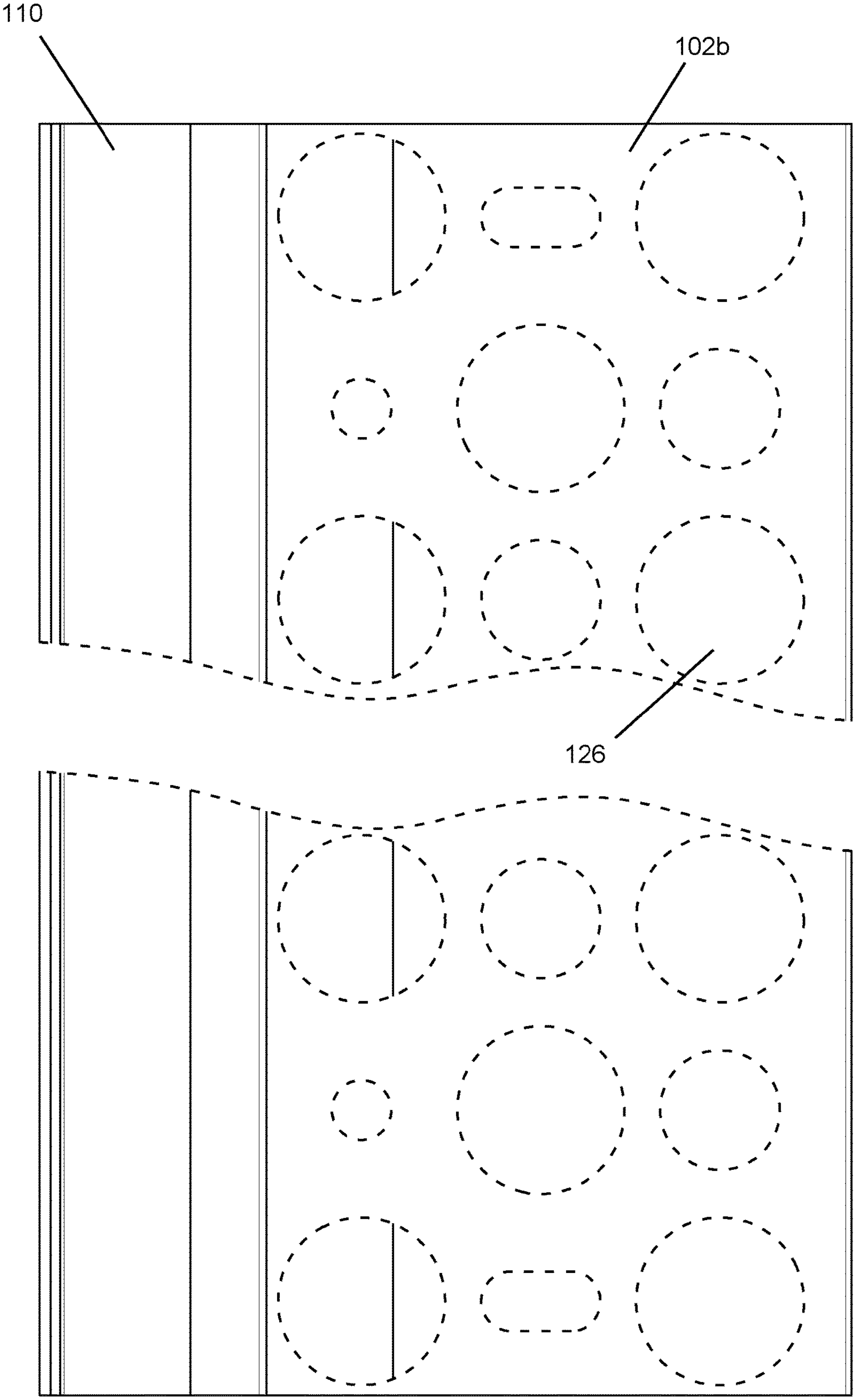
Figure 7:
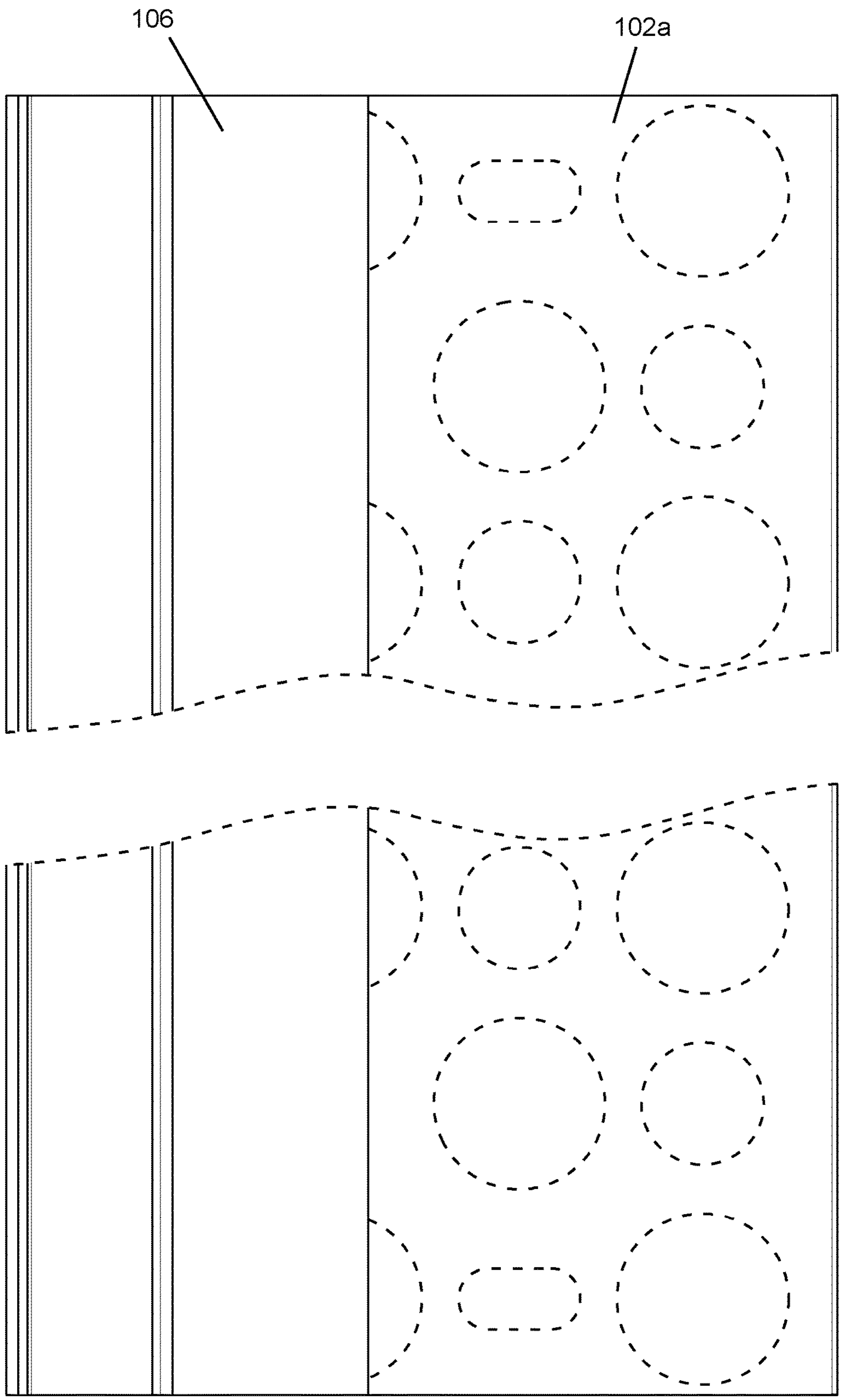

As shown in FIGS. 6 and 7, the base panel 102 includes at least one opening or aperture 126 formed or extending between the front face 102*a* and the rear face 102*b*. The openings 126 may be circular, oblong, triangular, rectangular, square, or any suitable shape and may be arranged in any suitable pattern. For example, the illustrated embodiment of FIGS. 6 and 7 includes a plurality of circular and oblong openings 126 of different sizes arranged in rows and columns along the base panel 102. The pattern of openings 126 may repeat along the length of the casing bead 100. The casing bead may comprise any suitable length, and multiple casing beads may be aligned next to one another, so that one or more casing beads may abut the entirety of a jamb at which they are installed.

Referring to FIG. 1, the first support arm 114 provides an upper or outer side of the spacing member 110 (i.e., that faces away from the wall at which the casing bead is disposed), the second support arm 116 provides a lower or inner side of the spacing member 110 (i.e., that faces the wall at which the casing bead is disposed), and the convex surface or wall 112 provides a contacting surface of the spacing member 110 for engaging the adjacent wall element. Thus, the self-adhering casing bead apparatus comprises, for example, the base panel 102 having the front face 102*a*, the rear face 102*b* and at least one opening 126. The stop bead wall 104 has a top edge and a bottom edge, the bottom edge formed on the base panel 102 and the stop bead wall 104 extending from the front face 102*a* of the base panel 102. The stop bead wall 104 has the first side 104*a*, the second side 104*b* and the flange 106 extending from the top edge and at least partially above the front face 102*a* of the base panel 102. The spacing member 110 has the upper side 114, the first foot or leg 120 in communication with the upper side 114, the convex bottom 112, the lower side 116 and the second foot or leg 122 in communication with the lower side 116. The upper side 114 is offset from the top of the stop bead wall 104 and flange 106, and the first leg 120 and the second leg 122 are in communication with the second side 104*b* of the stop bead wall 104. At least one adhesive strip 118, 124 is in communication with the spacing member 110. The first side 114 may be offset from the upper end of the stop bead wall 104 and the flange 106, such as by 3/16 of an inch. There may, optionally, be at least one adhesive strip 118, which may be double sided tape, in communication with the convex bottom 112 of the spacing member 110.

There may, optionally, be one or more additional adhesive strip(s) 124, which may be double sided tape, in communication with the rear face 102*b* of the base panel 102. The base panel 102 has a proximal end or portion proximal to stop bead wall 104 and a distal end or portion distal from the proximal end and the at least one adhesive strip 124 may be attached to and along the distal portion, the proximal portion (as shown in FIG. 1) or anywhere in between on the base panel 102 at the rear face 102*b* of the base panel 102. In other words, the stop bead wall 104 may be formed at an end or portion of the base panel 102 (and extend from the front face 102*a* of the base panel at the end) and the adhesive member 124 may be disposed at the rear face 102*b* of the base panel 102 at the proximal end of the base panel 102 relative to the stop bead wall 104, the adhesive member 124 may be disposed at the rear face 102*b* of the base panel 102 at the distal end of the base panel relative to the stop bead wall 104, and/or the adhesive member may be disposed at any suitable portion at the rear face 102*b* of the base panel 102.

Figure 8:
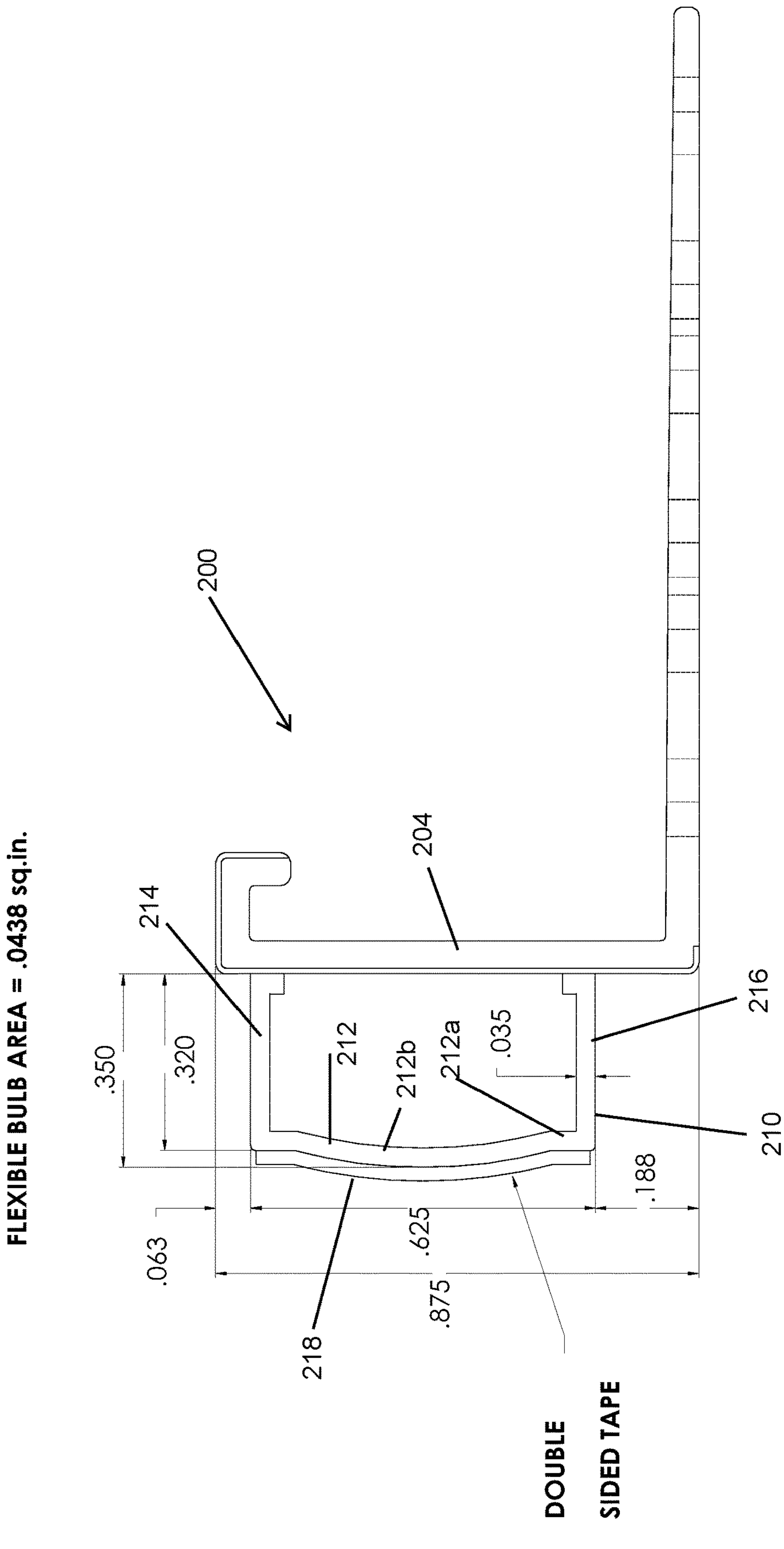
FIGS. 8 and 9 are side views of other self-adhering casing beads showing example dimensions of the casing beads.
Figure 9:
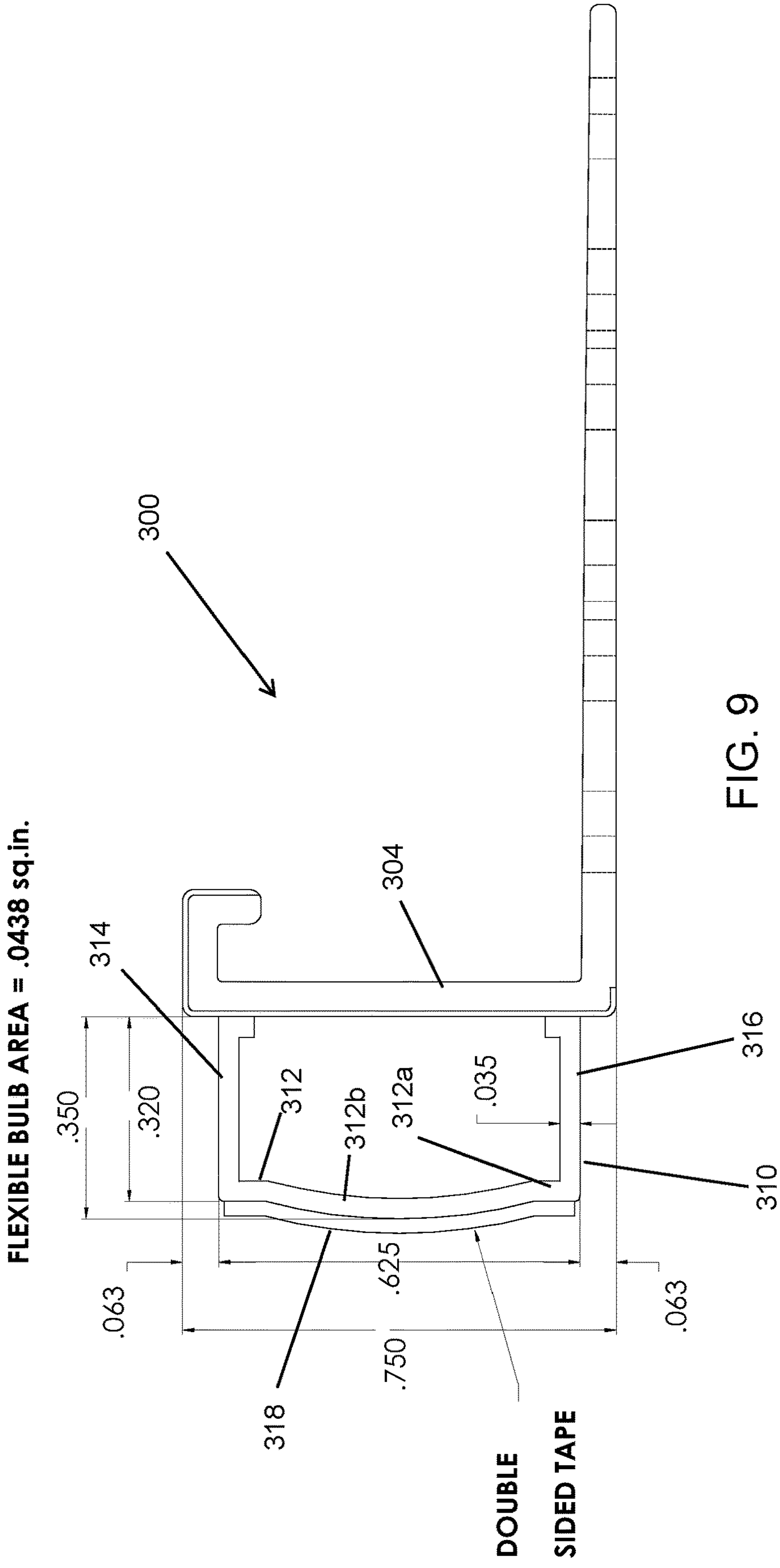
Figure 10:
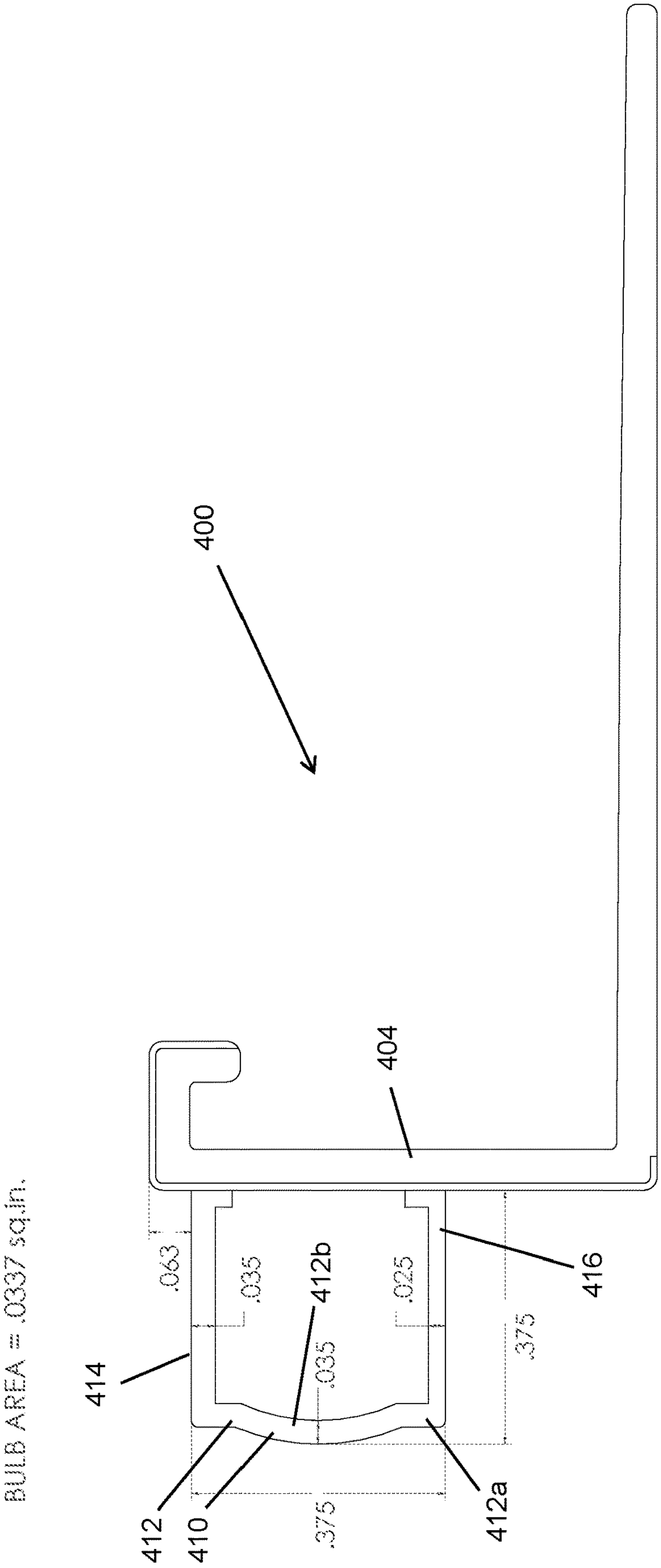
FIG. 10 is a side view of another self-adhering casing bead showing example dimensions of the casing bead.
Figure 11:
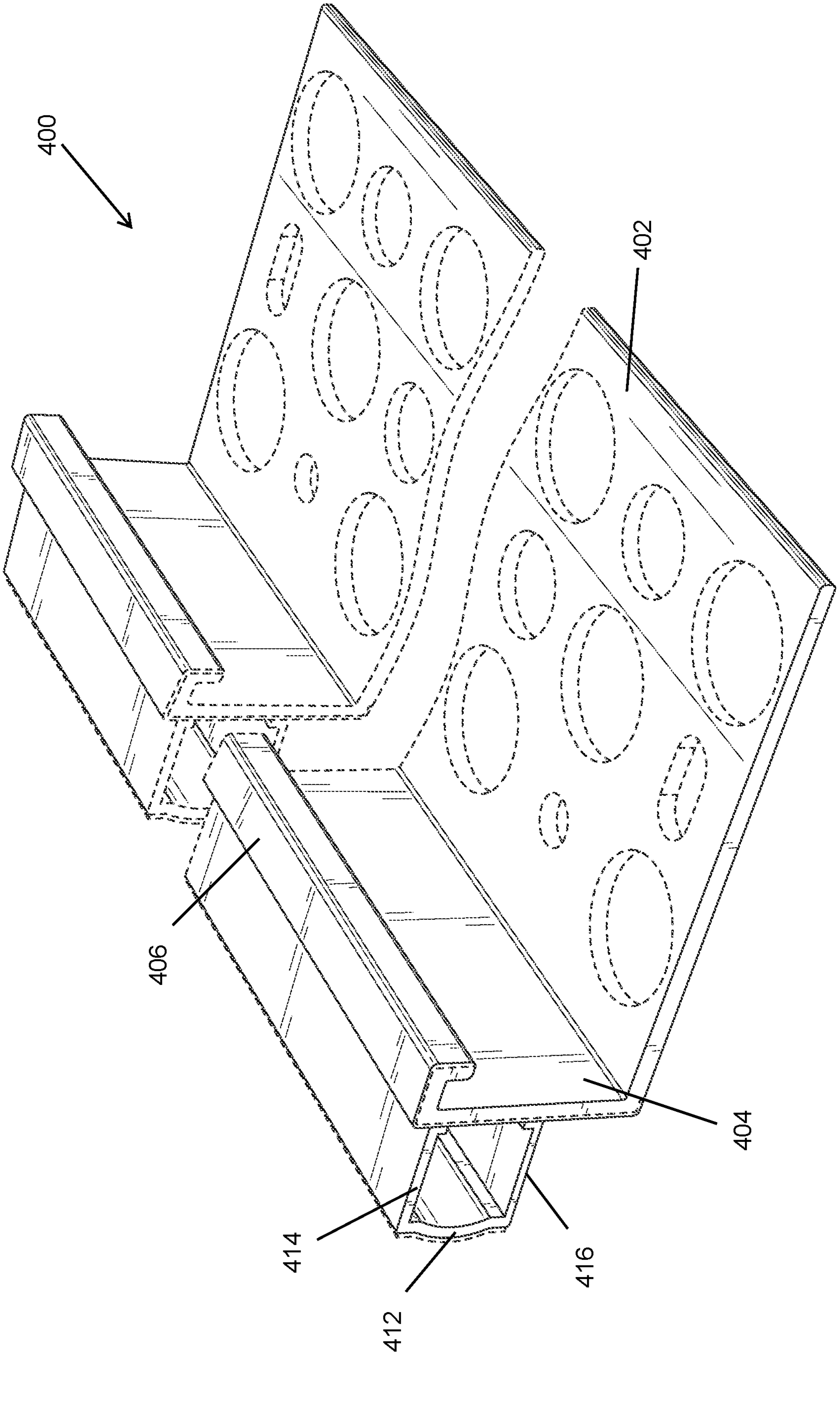
FIG. 11 is a perspective view of the self-adhering casing bead of FIG. 10.
Figure 12:
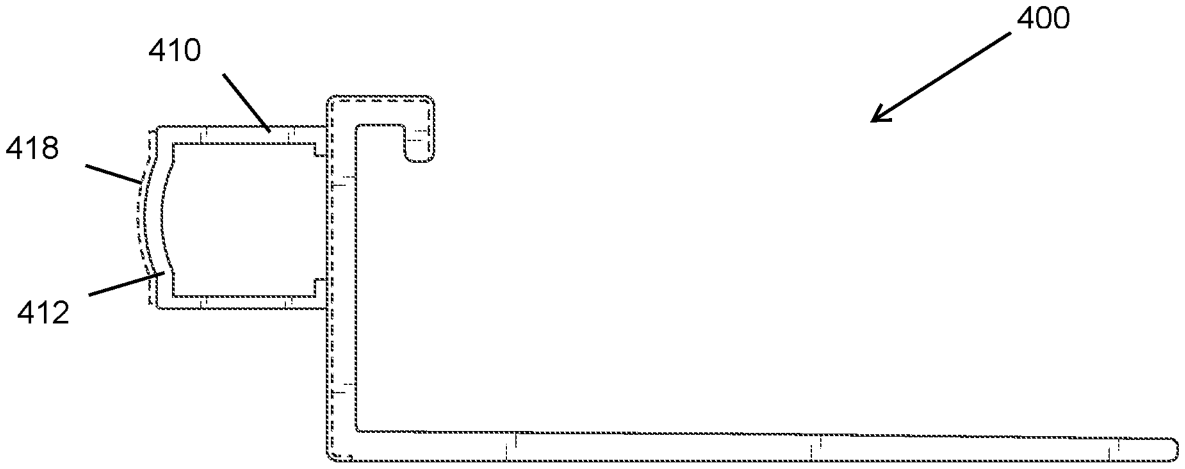
FIGS. 12-17 are side views of the self-adhering casing bead of FIG. 10, showing an adhesive member disposed at the casing bead.
Figure 13:
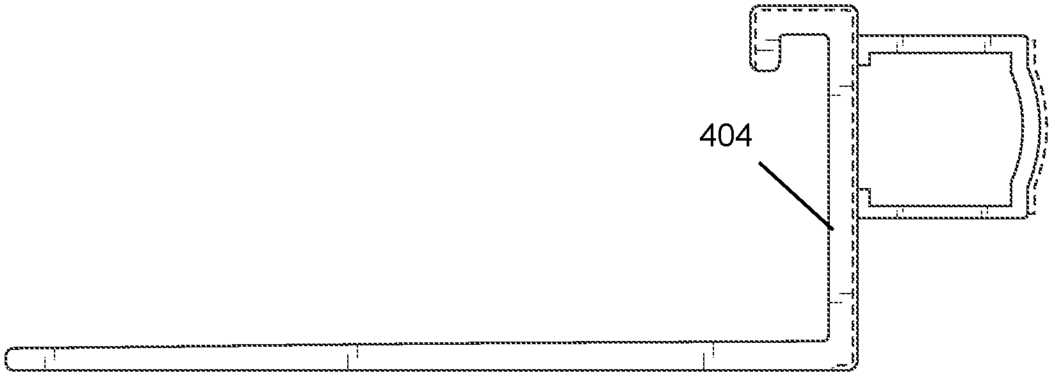
Figure 14:
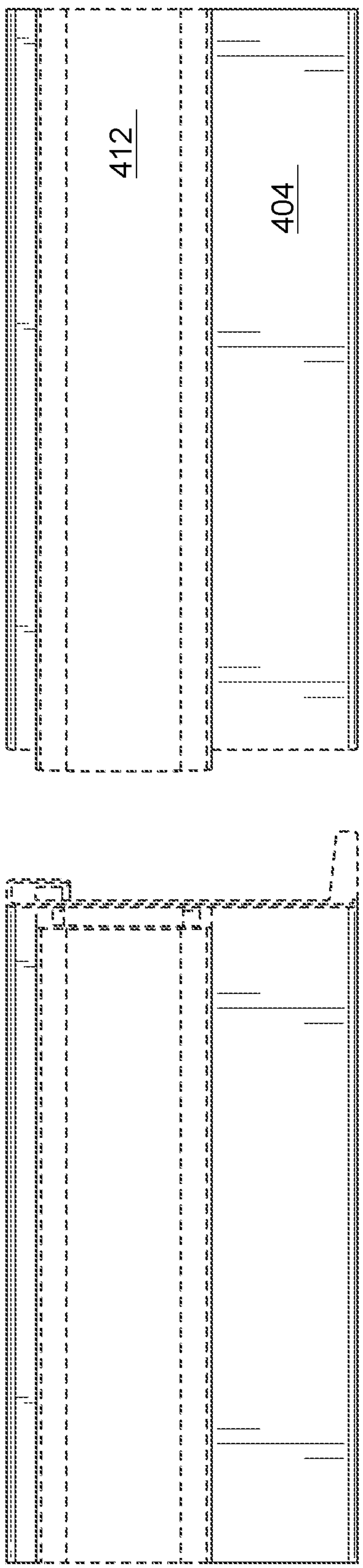
Figure 15:
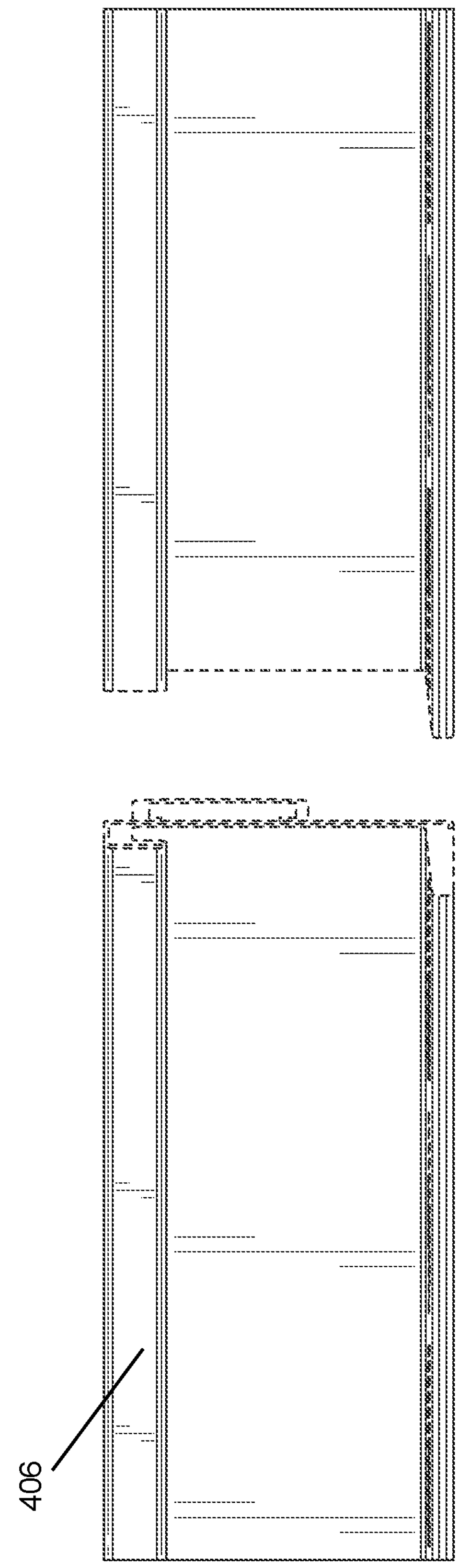
Figure 16:
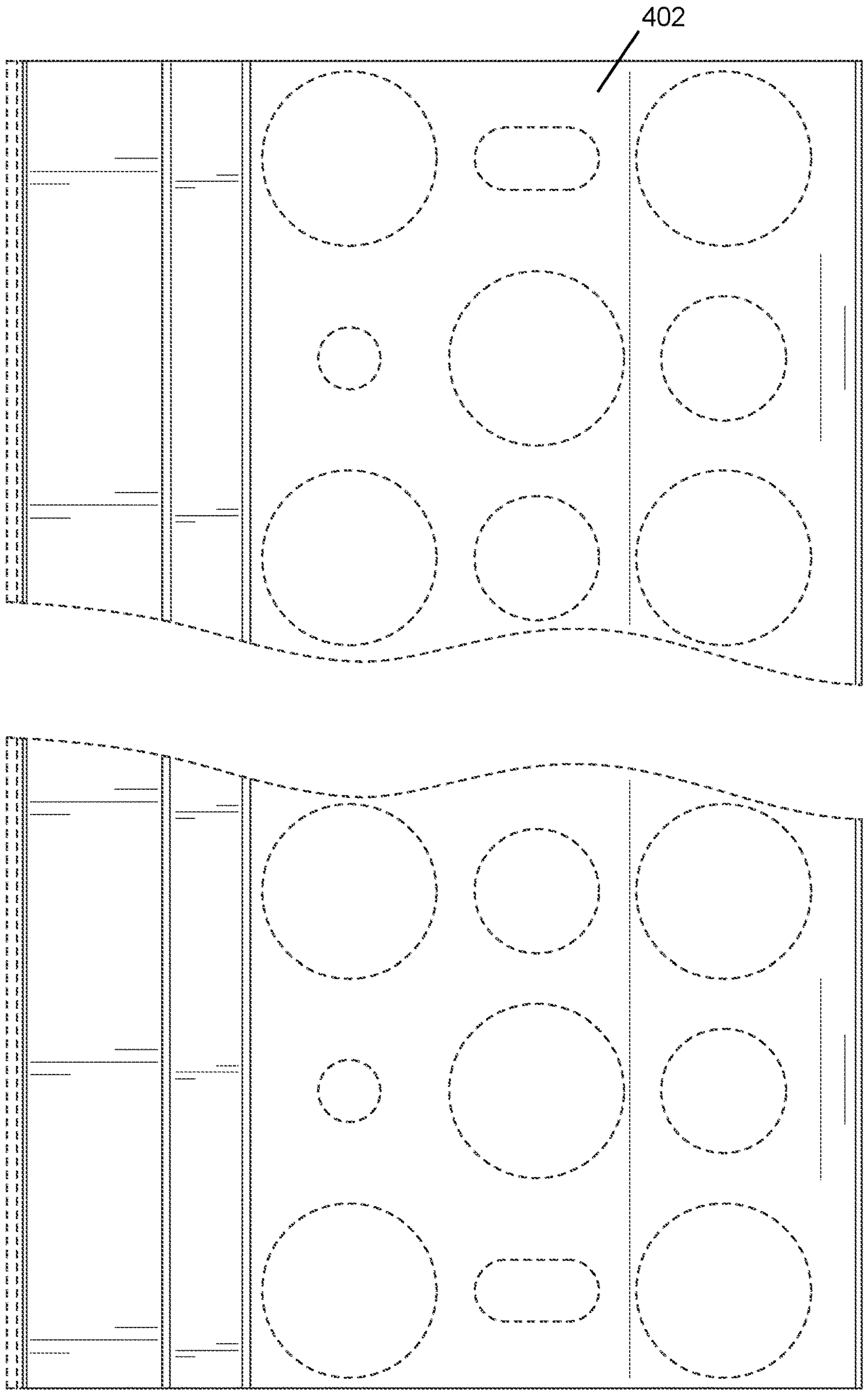
Figure 17:
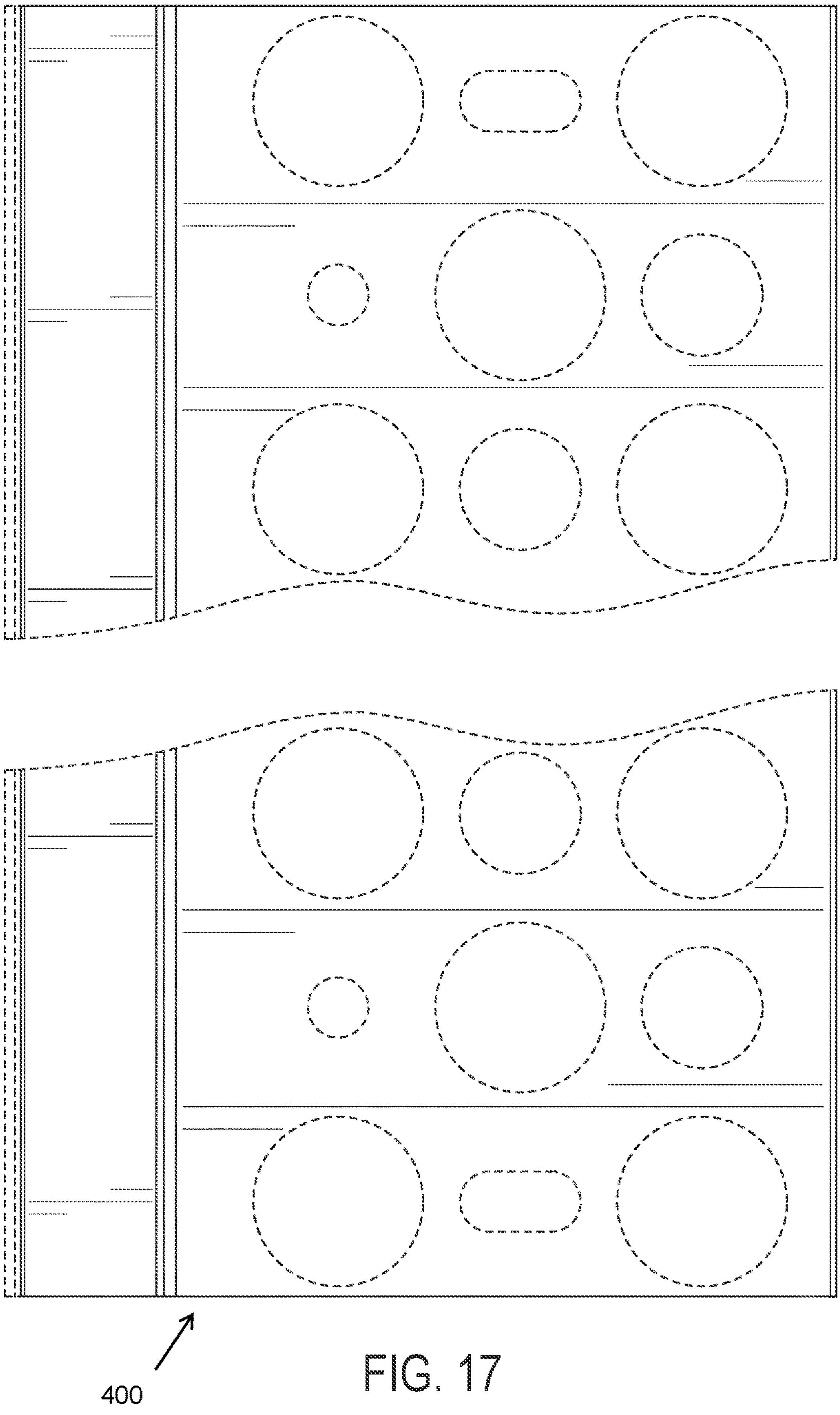
Figure 18:
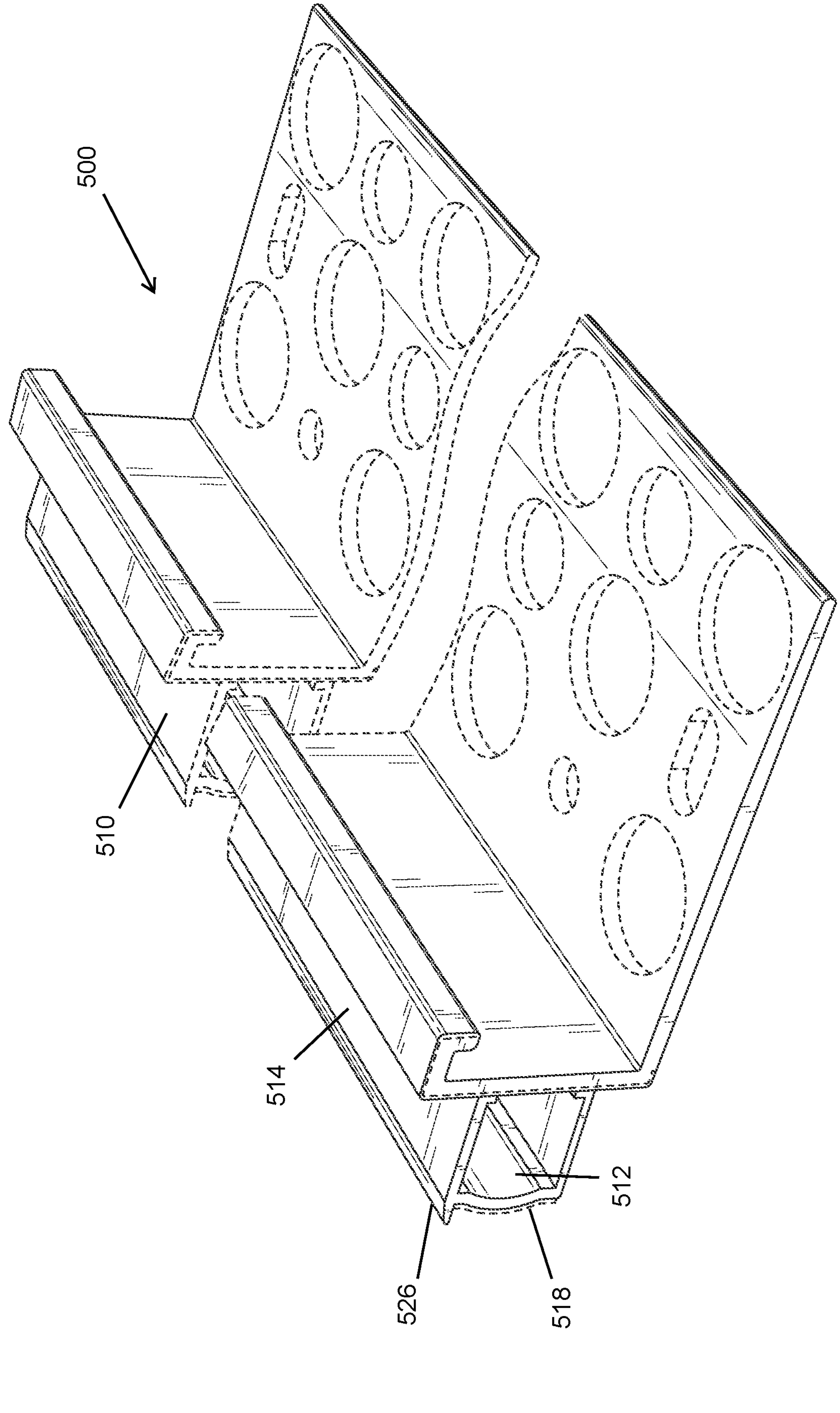
FIG. 18 is a perspective view of a self-adhering casing bead having a spacing member that includes a fin extending from an outer surface of the spacing member.
Figure 19:
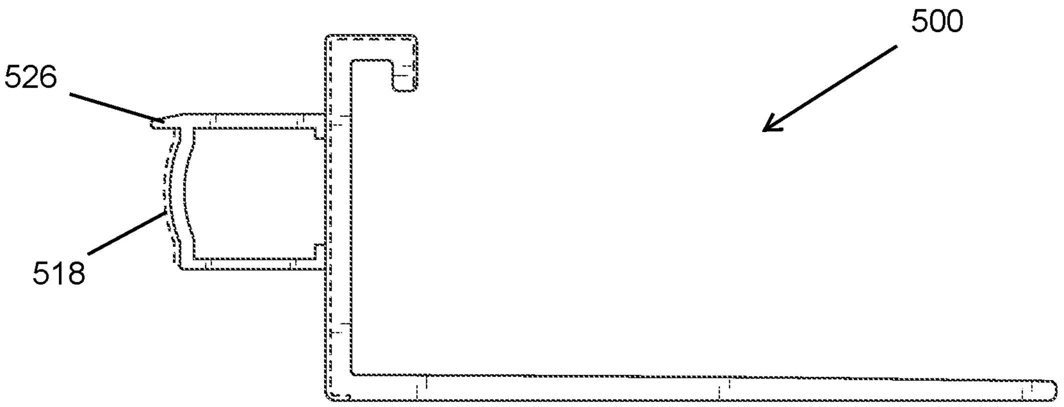
FIGS. 19-25 are side views of the self-adhering casing bead of FIG. 18.
Figure 20:
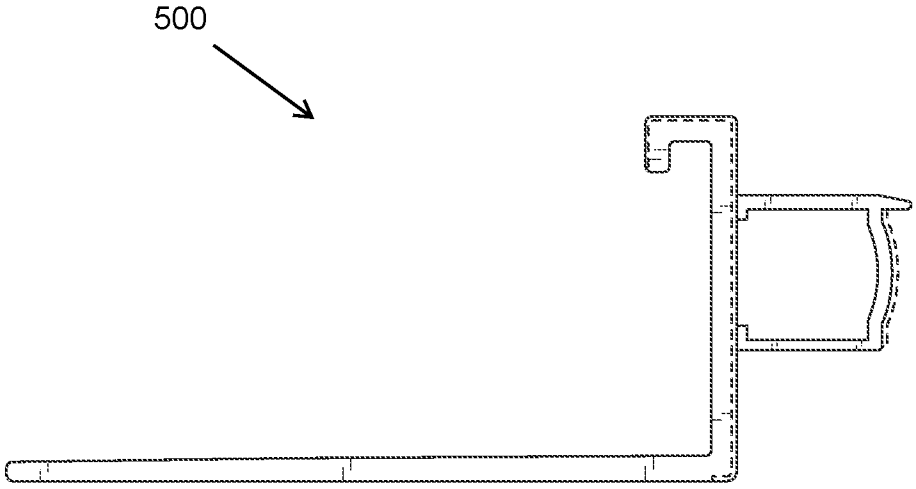
Figure 21:
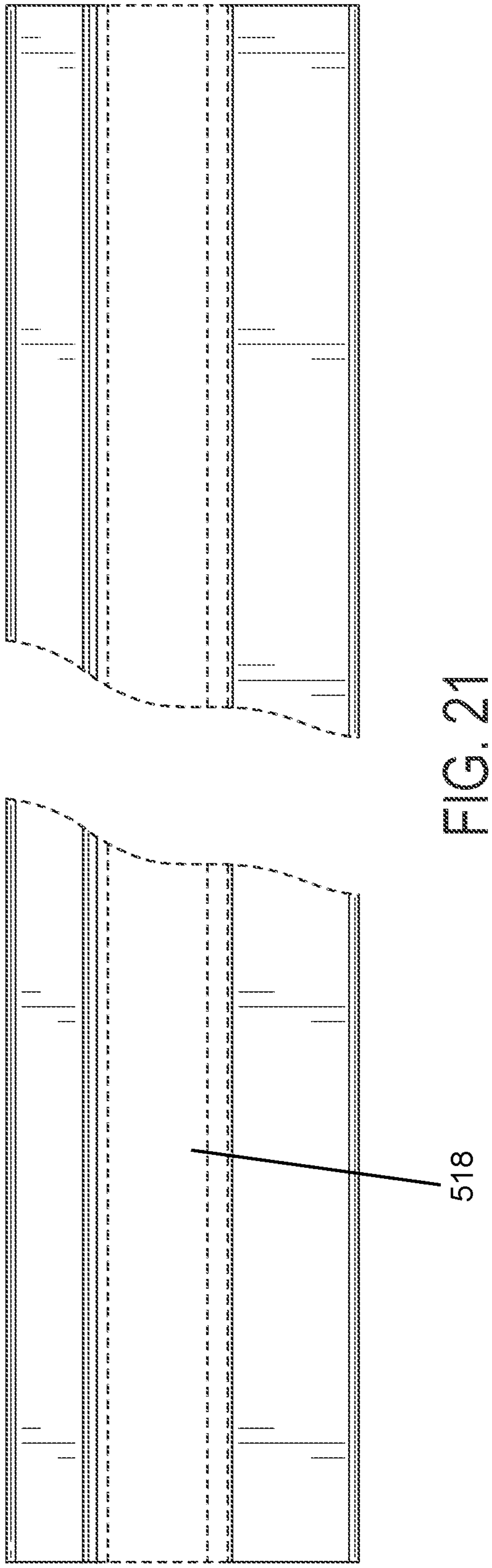
Figure 22:
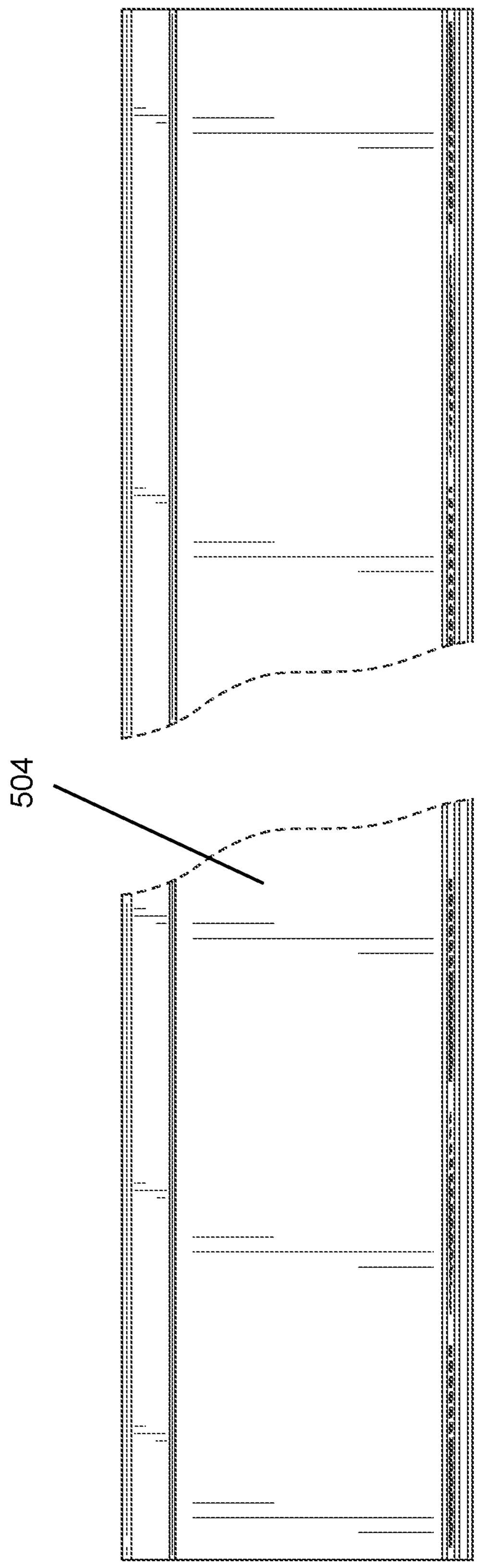
Figure 23:
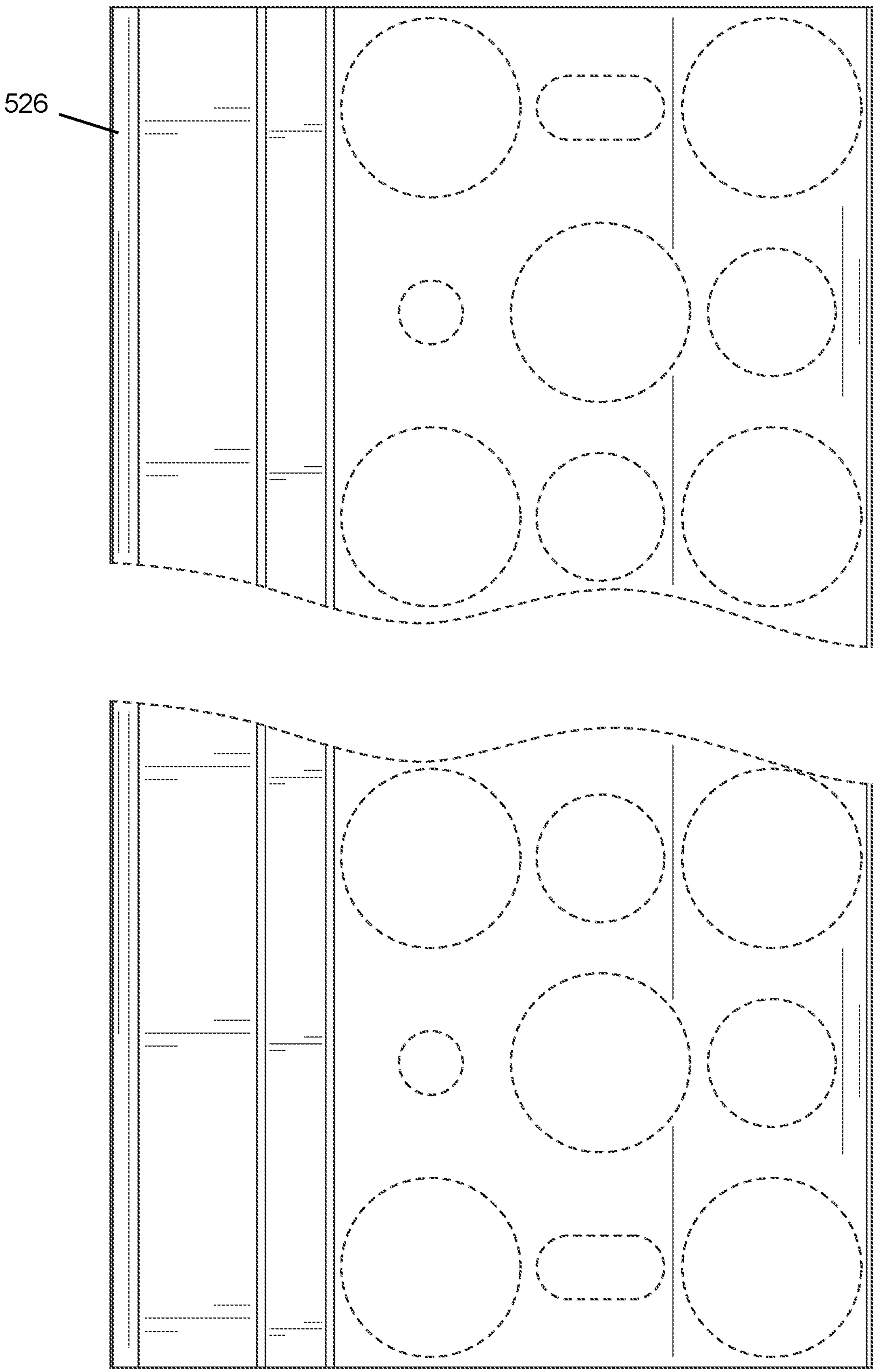
Figure 24:
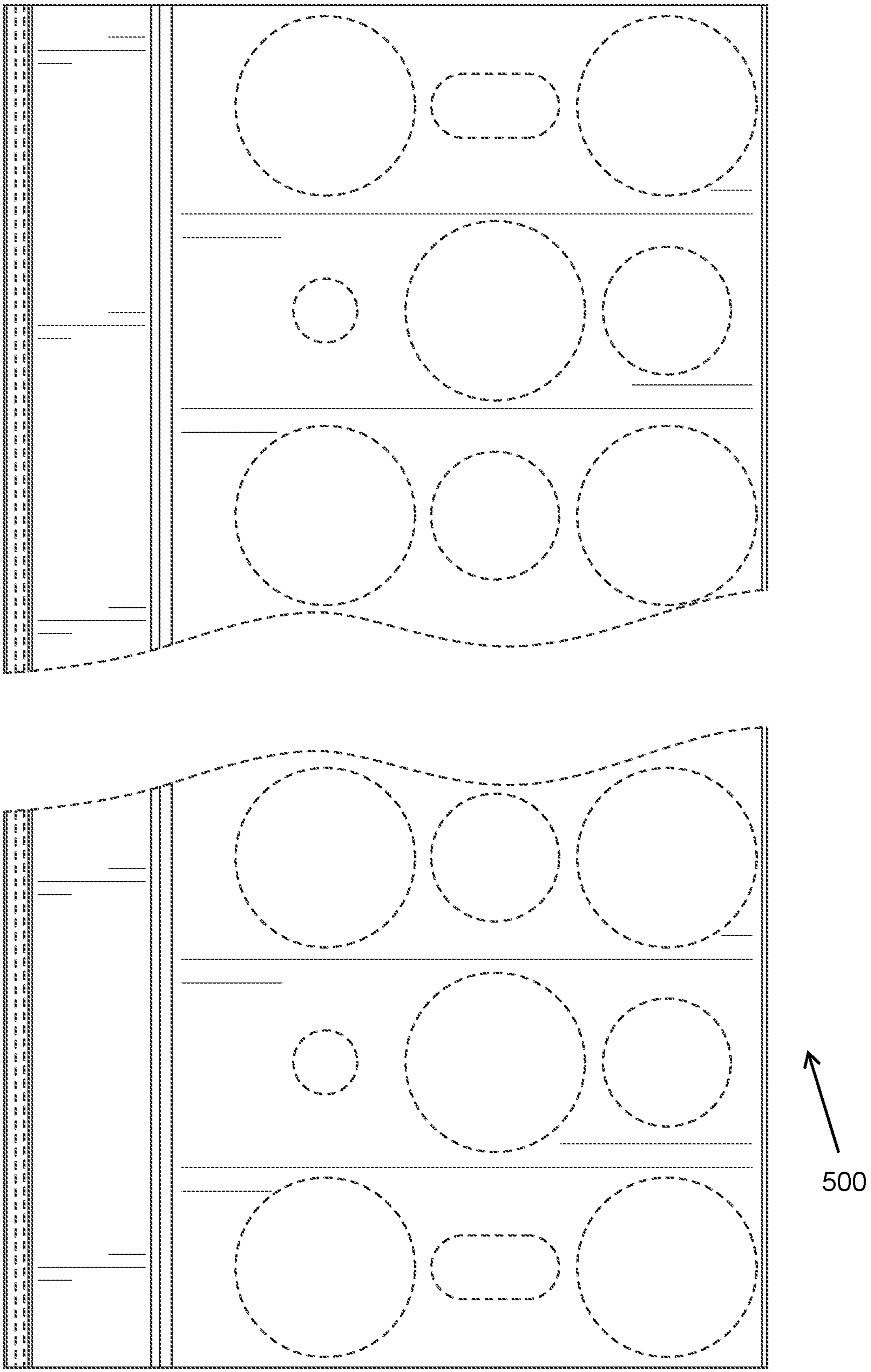

FIGS. 8-10 depict self-adhering casing beads 200, 300, and 400 with examples of dimensions for illustrative purposes. As shown, the spacing member may comprise any suitable construction and dimensions along the outer surface of the stop bead wall to provide a flexible engaging portion of the casing bead and a surface for receiving caulk or sealant. For example, the compressible wall may be a convex wall, a concave wall, or a partially convex or concave wall. As shown, the casing beads 200, 300, and 400 respectively include spacing members 210, 310, 410 with partially convex surfaces or walls 212, 312, 412 spaced from the stop bead walls 204, 304, 404 via support arms or walls. In each illustrated embodiment of FIGS. 8-10, the respective partially convex surface 212, 312, 412 is spaced from the stop bead wall 204, 304, 404 by, and integrally formed with, a first support arm 214, 314, 414 and a second support arm 216, 316, 416. The respective partially convex surface 212, 312, 412 includes lateral flat portions 212*a*, 312*a*, 412*a* and a central convex bulb portion 212*b*, 312*b*, 412*b* abridging the flat portions, where the first and second support arms extend from the outermost ends of the partially convex surface at ends of the respective flat portions that are distal from the central convex bulb portion. The respective first and second support arms are disposed at (such as attached to or integrally formed with) the stop bead wall 204, 304, 404. In FIGS. 8 and 9, a respective adhesive member 218, 318 (such as double sided tape) is disposed at and conforms to the partially convex surface for adhesion of the casing bead to a jamb (as shown in FIGS. 11-17, the casing bead 400 may also have an adhesive strip 418 disposed along the partially convex surface or wall 412).

As shown in FIG. 10, the self-adhering casing bead 400 includes a spacing member 410 having first and second support arms 414, 416 where the first and second support arms have differing thicknesses from one another (for example, the spacing members 210, 310 of the casing beads 200, 300, have respective first support arms 214, 314 and second support arms 216, 316 having the same or about the same thicknesses as one another). The thicker wall of the first support arm 414 and the thinner wall of the second support arm 416 allows for collapsing of the spacing member 410 toward the thinner wall 416 and reduces or avoids or limits collapsing of the thicker wall 414. Thus, when a force is applied on the spacing member 410 (such as from an expanding door or window jamb), the spacing member 410 may flex or bend toward and/or at the second (thinner) support arm 416 and flexing and/or bending of the first (thicker) support arm 414 will be reduced or eliminated. This reduces risk of breaking the seal provided by caulking disposed at the outer surface of the first support arm 414. In other words, when the jamb expands and presses against the spacing member 410, the spacing member 410 is biased toward collapsing at the second support arm 416 (because of its lesser thickness) and thus will not collapse (or will be less likely to collapse) toward the first support arm 414 under the typical forces of an expanding jamb.

As shown in FIGS. 10-17, the self-adhering casing bead 400 with a spacing member 410 having first and second support arms of differing thicknesses includes a base panel 402, a stop bead wall 404 formed with the base panel 402 and extending from (and generally normal to) a front face of the base panel. A flange 406 extends from the stop bead wall 404 above the front face of the base panel 402. The base panel 402 includes at least one opening or aperture extending between the front face and a rear face. Optionally, the base panel 402 may include one or more rows of openings, such as a first row of openings, a second row of openings, and a third row of openings. The one or more rows of openings may each comprise a pattern and extend substantially across the base panel.

Optionally, an adhesive member 418 may be disposed at the spacing member 410, such as at the partially convex surface 412, to retain the casing bead 400 at the wall and/or jamb at which the casing bead is being installed. Additionally, an adhesive member may be disposed at the rear face of the base panel 402 to retain the base panel at a portion of the wall at which the casing bead is being installed. The adhesive member may be disposed at any suitable location at the rear face of the base panel, such as at a proximal end or portion of the base panel proximal to the stop bead wall 404 or a distal end or portion of the base panel distal from the proximal end.

Optionally, the self-adhering casing bead may, instead of having a J-shaped flange or lip at an end of the stop bead wall distal from the base panel, include a planar stop bead wall, such as for use of the casing bead in siding applications. In other words, the stop bead wall may not include a flange extending from an upper or outer end of the stop bead wall and along the base panel. Thus, where a J-shaped flange may be configured to receive excess stucco or plaster material of a wall at which the casing bead is installed to retain the casing bead at the wall and provide a flush or neat or uniform-looking seam between the wall and the casing bead, a planar stop bead wall (that does not have a flange) allows the wall covering material (such as vinyl siding) to directly abut the casing bead. When the casing bead includes a planar stop bead wall, the top edge of the stop bead wall may still be offset from the top surface (first support arm) of the spacing member to accommodate placement of a caulk or sealant at the seam between the jamb and the casing bead.

Optionally, the width or thickness of the tape (i.e., the width of the tape along the outer surface of the wall of the spacing member) may be increased, such as to 0.3875 inches or more. Optionally, the upper surface of the spacing member may be moved further from the upper end of the flange, such as to provide an offset of 0.1875 inches or more, to provide room for a greater volume or thickness of caulk or sealant and/or bond-breaking tape at the upper surface of the spacing member.

Optionally, and such as shown in FIGS. 18-25, a casing bead 500 may include a spacing member 510 disposed along a side of the stop bead wall 504 of the casing bead where the spacing member 510 includes a lip or tab or fin or flange or extension 526 extending from the spacing member 510. The fin 526 extends from the wall 512 of the spacing member (i.e., the leading edge of the casing bead) so as to engage the adjacent wall element (e.g., window frame or door jamb) when the casing bead 500 is positioned at the wall element. The fin 526 may taper as it extends from the spacing member 510 and may provide a rounded terminal edge distal from the spacing member. In other words, the fin 526 may have a greater thickness at or near the spacing member 510 and a lesser thickness at an end of the fin 526 distal from the spacing member 510.

In the illustrated embodiment of FIGS. 18-25, the fin 526 extends from the outer surface of the wall 512 of the spacing member at a position that corresponds to the first supporting arm 514 so that the fin 526 is at least partially co-planar with the upper surface of the first supporting arm 514. In other words, at an upper or outer end of the flexible wall 512, the first supporting arm 514 extends from a first side of the wall 512 facing the stop bead wall 504 and the fin 526 extends from an opposite second side of the wall 512 facing away from the stop bead wall 504 and toward the wall element.

With the adhesive member 518 disposed at the outer surface of the spacing member 510, the fin 526 provides an upper boundary or divider or edge between the upper surface of the first supporting arm 514 and the adhesive element 518 at the outer surface of the wall 512 so that, when caulk or other sealant is disposed at the upper surface of the first supporting arm 514, the sealant does not drip or spill over or past the edge 526 onto or along the adhesive member 518. The fin 526 may also provide a barrier between the adhesive member 518 and the environment when the casing bead 500 is installed at the wall without a sealant at the upper surface of the spacing member 510. That is, the fin 526 is coplanar with or aligned with the upper or outer surface of the spacing member 510 (or at least above or further toward the upper surface than the adhesive member) and extends away from the spacing member 510 and over the adhesive member 518 at the wall 512 of the spacing member 510 to, for example, provide a barrier between the adhesive member 518 and the environment and/or sealant material at the upper surface of the spacing member. In other words, the adhesive element 518 may be substantially sealed or contained between the wall 512 of the spacing member 510, the wall element, and the fin 526 to preclude contaminants or moisture or sealant or caulk from affecting the adhesive element 518. For example, if moisture contaminates the adhesive element 518, the adhesive element 518 may disengage from the wall element. Additionally, the fin 526 provides a flexible engagement element for accommodating compression of the spacing member 510 from expansion of the window element.

Figure 25:
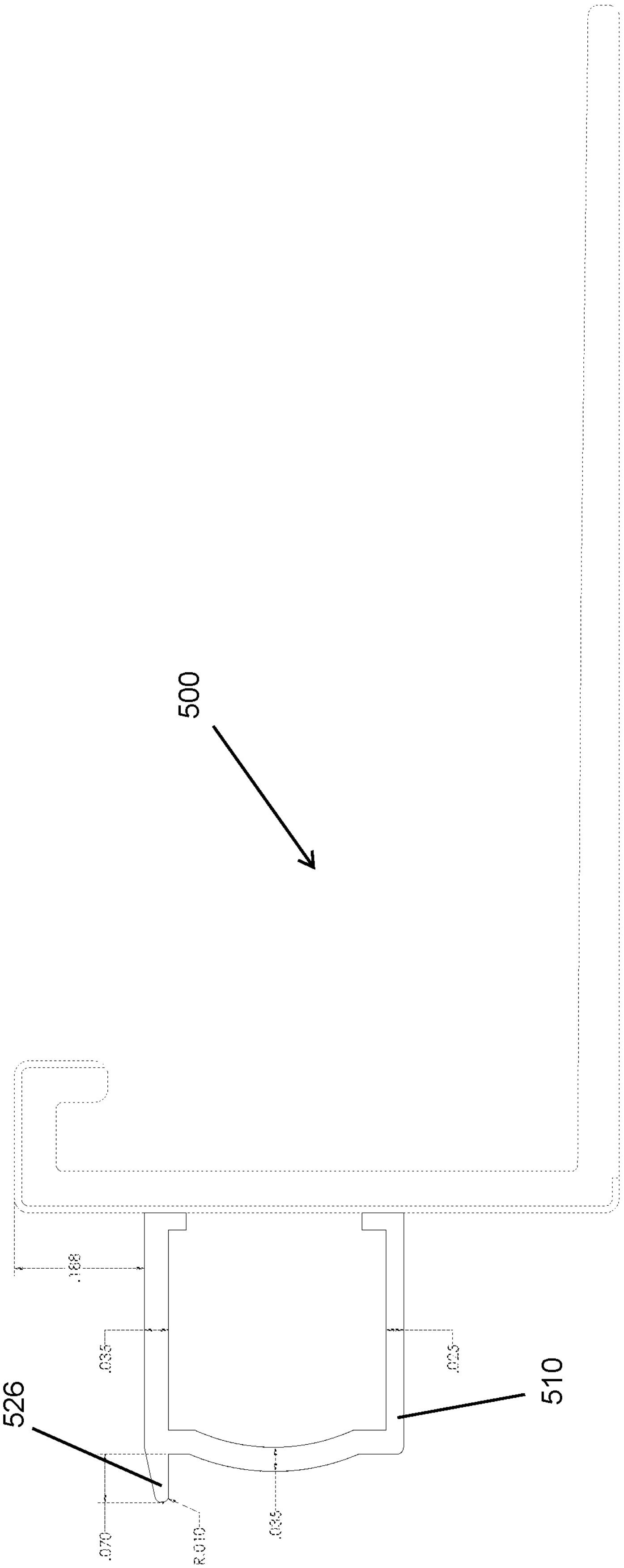
Figure 26:
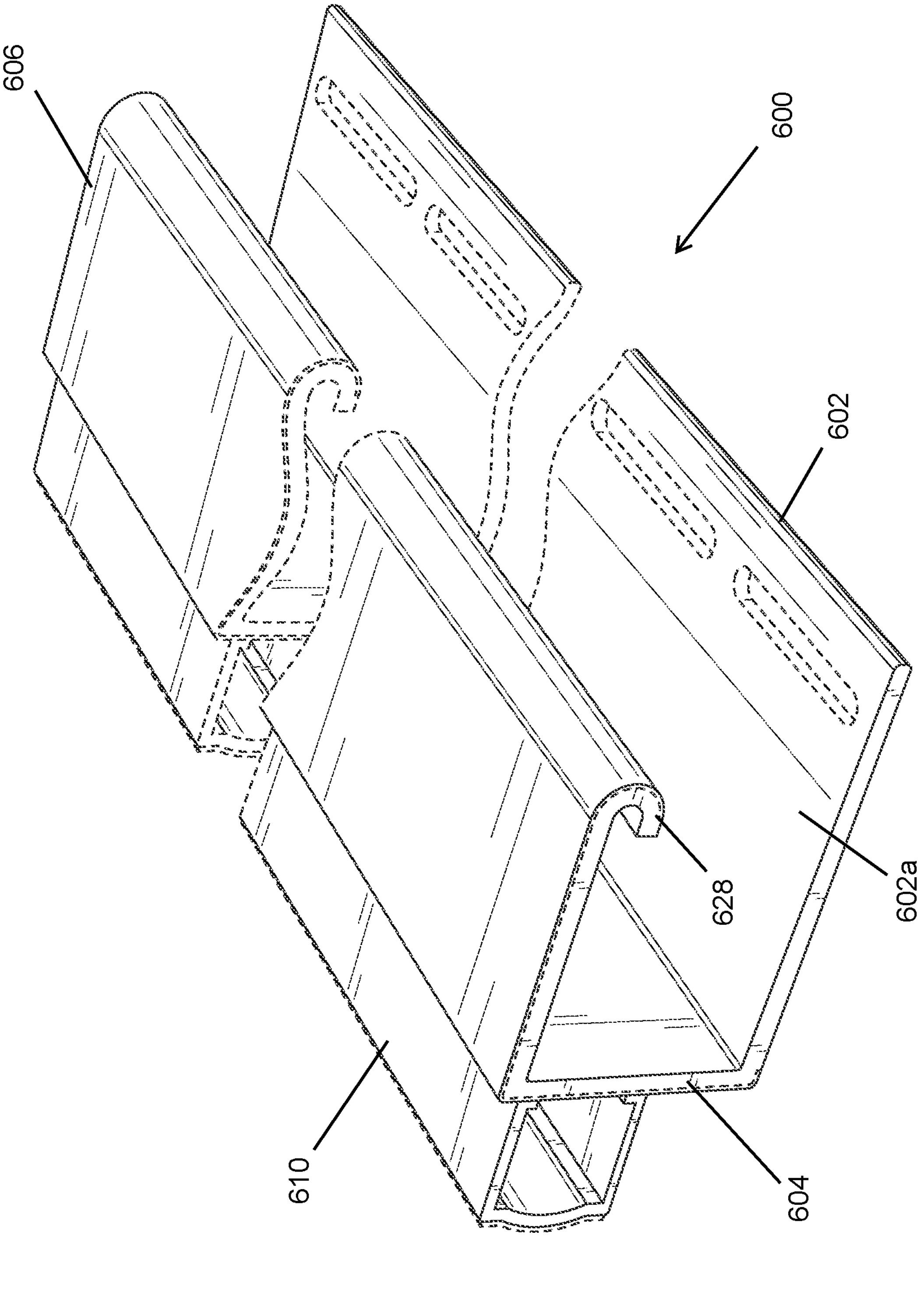
FIG. 26 is a perspective view of a self-adhering casing bead having a J-shaped flange extending from the stop bead wall.
Figure 27:
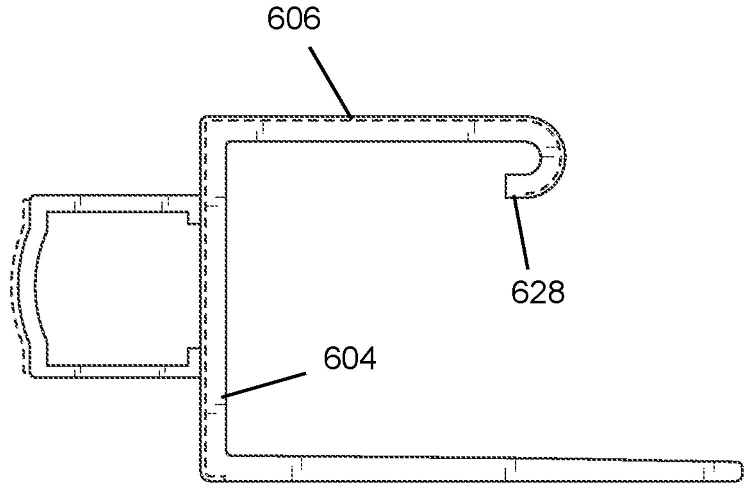
FIGS. 27-32 are side views of the self-adhering casing bead of FIG. 26.
Figure 28:
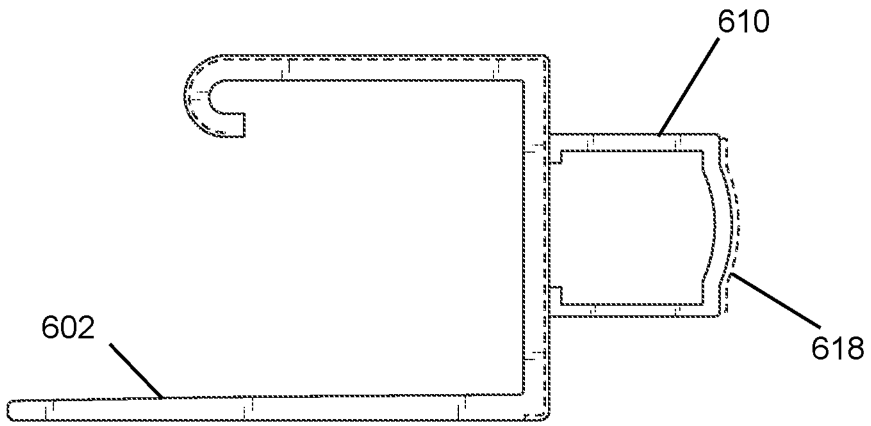
Figure 29:
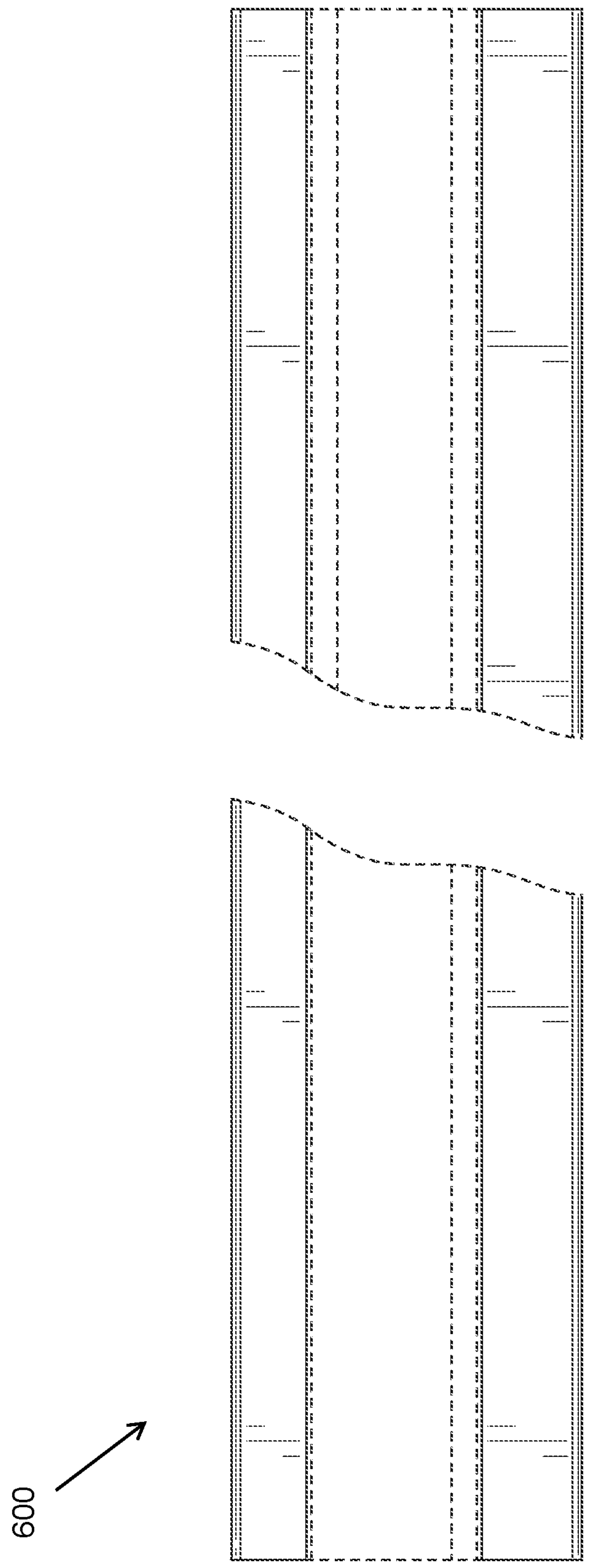
Figure 30:
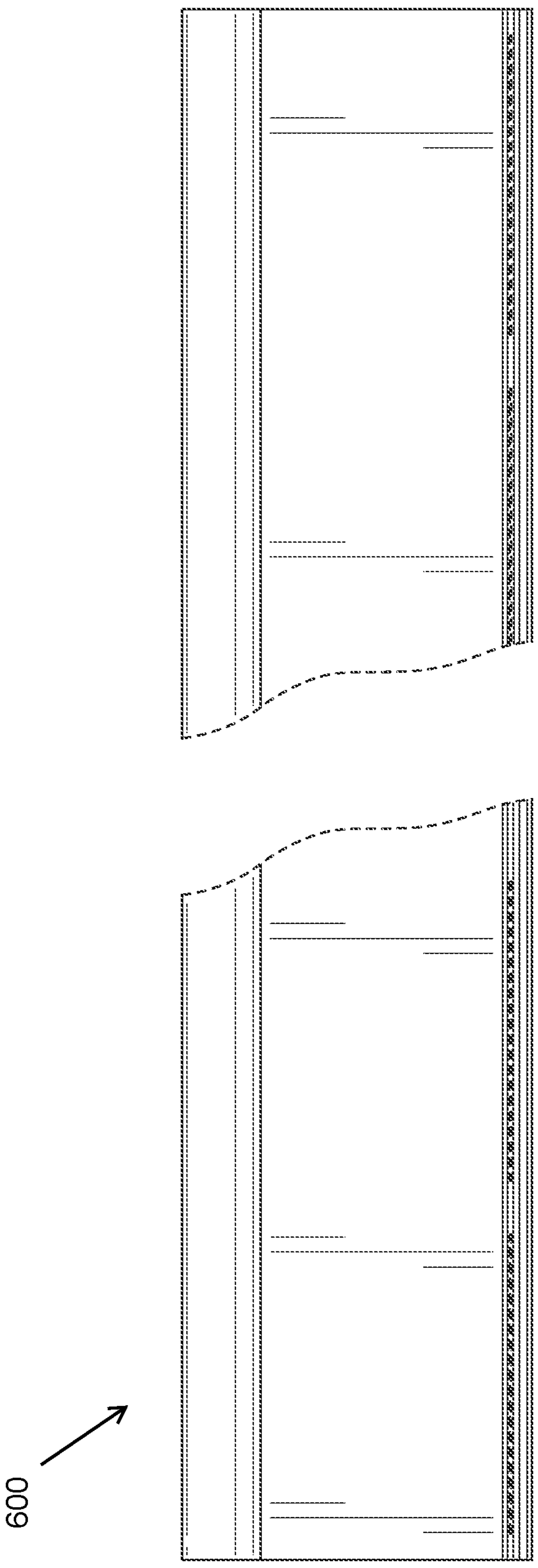
Figure 31:
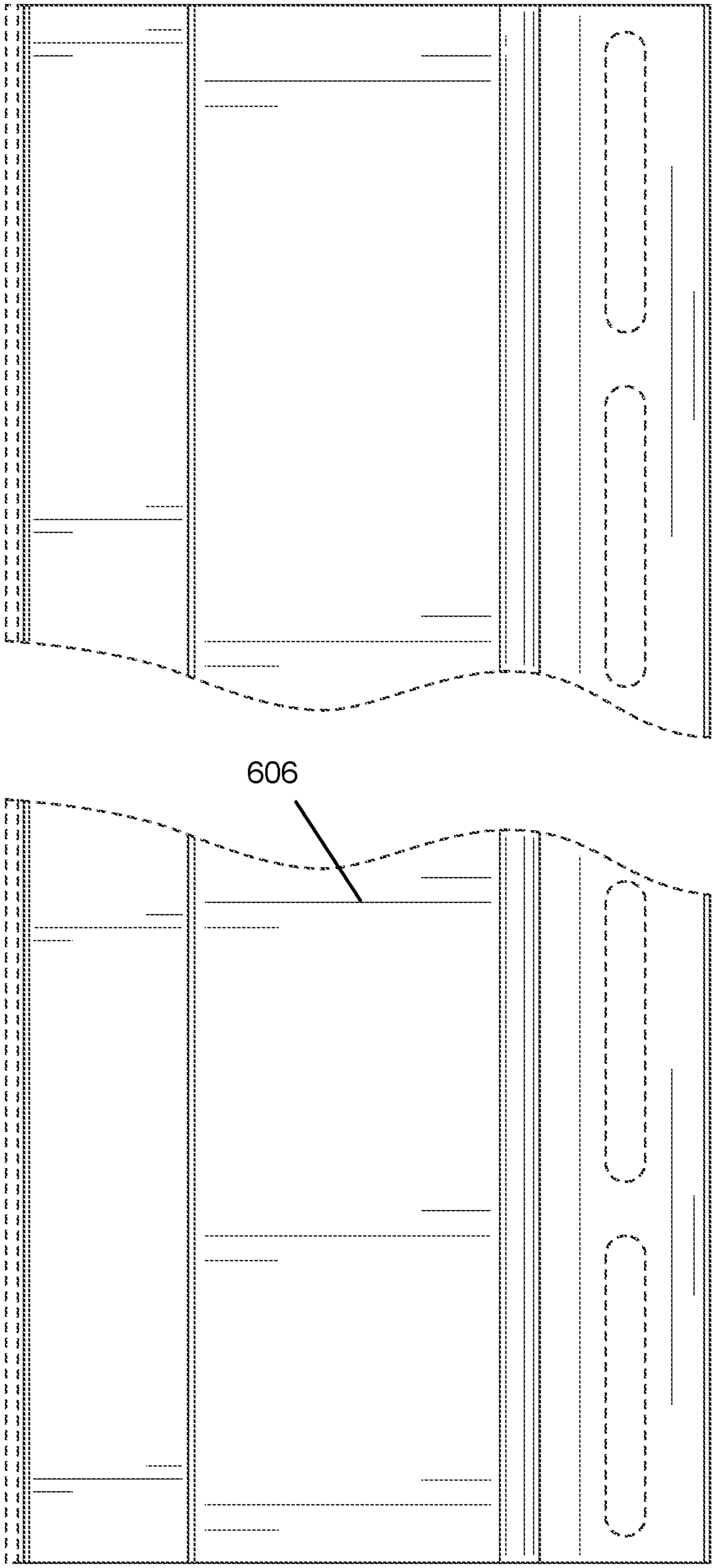
Figure 32:
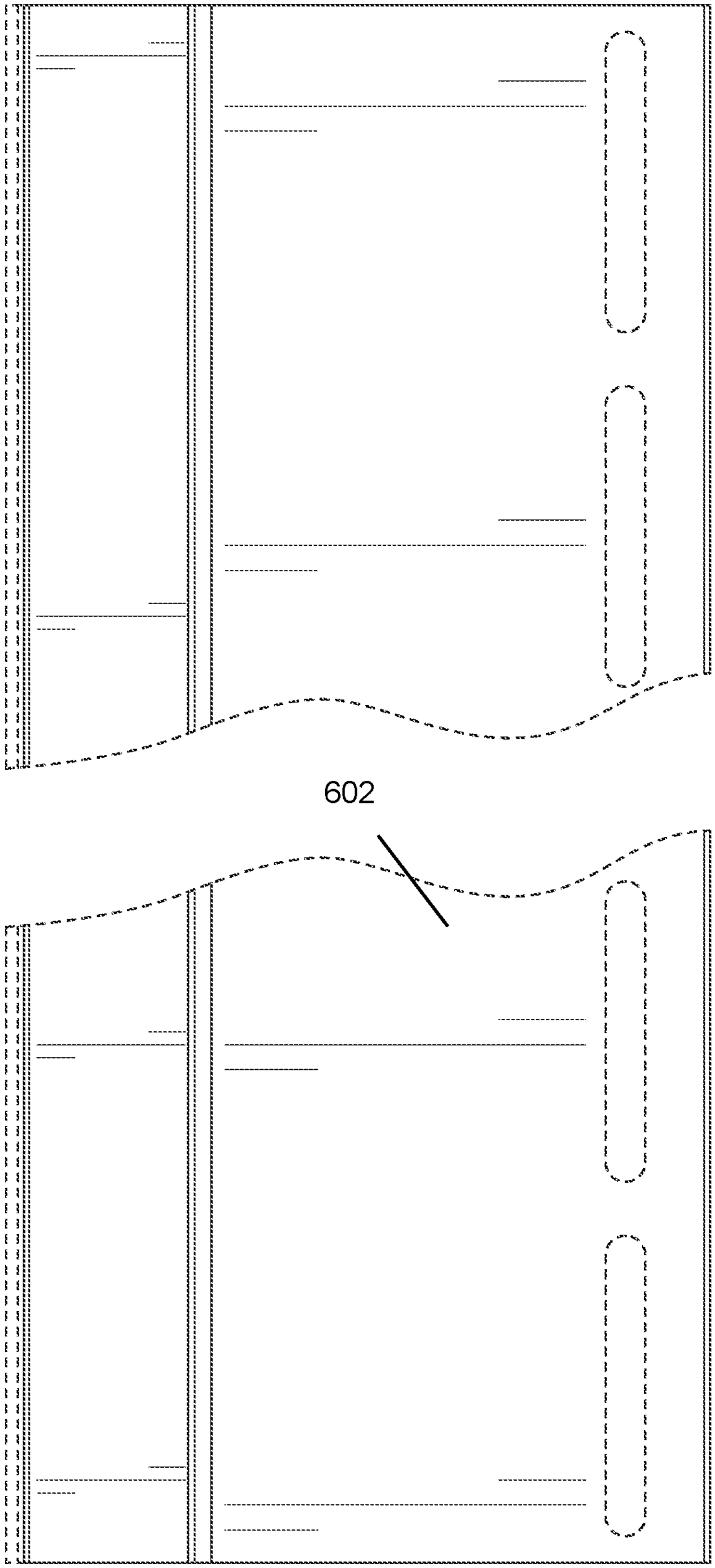

The fin is added at the leading edge of the casing bead to, for example, separate the sealant-receiving upper surface of the spacing member and the adhesive element at the outer surface of the spacing member. The spacing member may include any suitable wall or surface member, such as a planar or flat surface, a concave surface, a convex surface, or partially convex surface having planar lateral portions and a central bulb or convex portion. Additionally, the wall thicknesses of the first and second supporting arms and the wall or surface may be equal or unequal where a thinner second supporting arm may allow the spacing member to flex downward or inward toward the second supporting arm when compressed and equal thickness supporting arms may provide a more rigid or inflexible or equally flexing spacing member. FIG. 25 shows the casing bead 500 with example dimensions of the spacing member 510 and fin 526.

Optionally, and such as shown in FIGS. 26-32, a casing bead 600 may include a base panel 602, a stop bead wall 604 extending from the base panel 602, and a J-shaped flange 606 extending from an upper end of the stop bead wall 604 and over the first surface or face 602*a* of the base panel 602. The J-shaped flange 606 includes a U-shaped edge or return portion 628 at an end of the J-shaped flange 606 distal from the stop bead wall where the edge curves back toward the base panel 602 and the stop bead wall 604 and the cavity or channel of the U-shaped edge 628 faces the stop bead wall 604. While the J-shaped flange 606 may include a rounded, U-shaped edge in the illustrated embodiment, the J-shaped flange may optionally include a V-shaped edge or angled or sharp edge or a square or rectangular U-shaped edge, or any suitable return feature. The J-shaped flange 606 may extend substantially normal to the stop bead wall 604. Optionally, the J-shaped flange 606 extends from the stop bead wall 604 and at least partially toward or at least partially away from the base panel 602, such that the J-shaped flange 606 extends at an oblique angle relative to the stop bead wall 604 (such as an acute angle relative to the stop bead wall).

When rigid surface material, such as vinyl siding or stone veneer, is received between the base panel 602 and the J-shaped flange 606, the rigid surface material may be pressed between the J-shaped flange 606 and the base panel 602 and the U-shaped edge 628 may flex or compress toward the J-shaped flange 606 to accommodate the rigid surface material and provide a retaining force between the J-shaped flange and the base panel. That is, the U-shaped edge 628 of the J-shaped flange 606 provides a retaining feature for the casing bead 600 for holding or securing the surface material at the casing bead 600 when the surface material is pressed into and received between the base panel 602 and the J-shaped flange 606. Optionally, the J-shaped flange 606 may at least partially flex relative to the stop bead wall 604 to accommodate the rigid surface material between the J-shaped flange 606 and the base panel 602.

The spacing member 610 provides a flexible engagement element between the casing bead 600 and the wall element that provides a uniform edge for sealant between the casing bead and the wall element, such as the spacing members described herein. For example, the casing bead 600 may include a spacing member 610 having a lip or tab or fin or extension extending from the wall or upper support arm of the spacing member and configured to flexibly engage the adjacent wall element when the casing bead 600 is positioned at the vertical wall structure with the fin providing a barrier between the environment and the adhesive element 618 disposed at the spacing member. Thus, the spacing member 610 of the casing bead 600 may be similar to the spacing member 510 having the fin 526, as discussed above.

Optionally, and such as shown in FIGS. 33-38, a casing joint 700 may be used to provide a uniform seam or juncture between adjacent portions of wall such that a first stop bead wall 703 of a first portion of the casing joint 700 may be adjacent to or abut a second stop bead wall 705 of a second portion of the casing joint 700 and a first base panel or portion 702*a* of a base panel and a second base panel or portion 702*b* of a base panel may extend away from the first and second stop bead walls in opposite directions relative to one another. A spacing member 710 may be disposed between the abutting stop bead walls.

Thus, the casing joint 700 includes the first portion 702*a* of the base panel 702 and the first stop bead wall 703 extending from the first side or surface of the first portion 702*a* of the base panel. The second stop bead wall 705 extends from the first side or surface of the second portion 702*b* of the base panel 702. The first and second stop bead walls may extend from respective edges of the first and second portions of the base panel. Optionally, the stop bead walls may extend from a central portion of a shared base panel. An adhesive element may be disposed at second sides or surfaces of the base panel 702 for attachment of the casing joint 700 to a vertical wall structure.

Each of the first stop bead wall 703 and the second stop bead wall 705 includes a respective flange extending from an upper or outer edge of the respective stop bead wall and over the respective first or second portion of the base panel 702. Thus, the first stop bead wall 703 and first portion 702*a* of the base panel are configured to receive surface material (e.g., stucco, plaster, vinyl siding, stone veneer, or the like) of a first portion or section of the wall and the second stop bead wall 705 and the second portion 702*b* of the base panel are configured to receive surface material of a second portion or section of the wall. The flanges of the respective stop bead walls extend above and over the surface material to provide a uniform joint or gap between the sections of wall.

Figure 33:
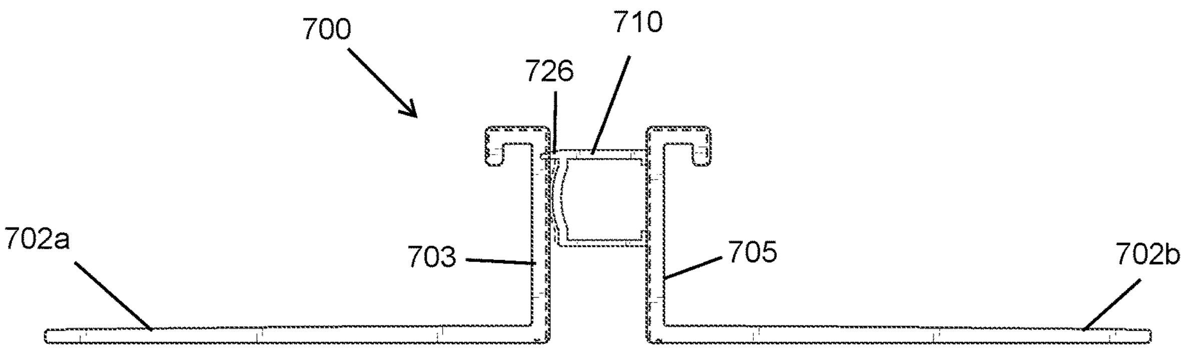
FIGS. 33-38 are side views of a casing joint having two stop bead walls extending from respective base panels and jointed by a spacing member.
Figure 34:
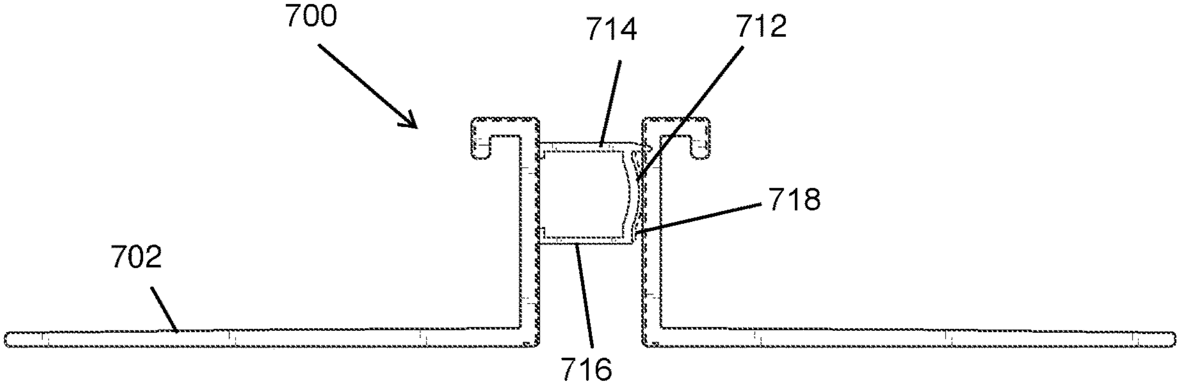
Figure 35:
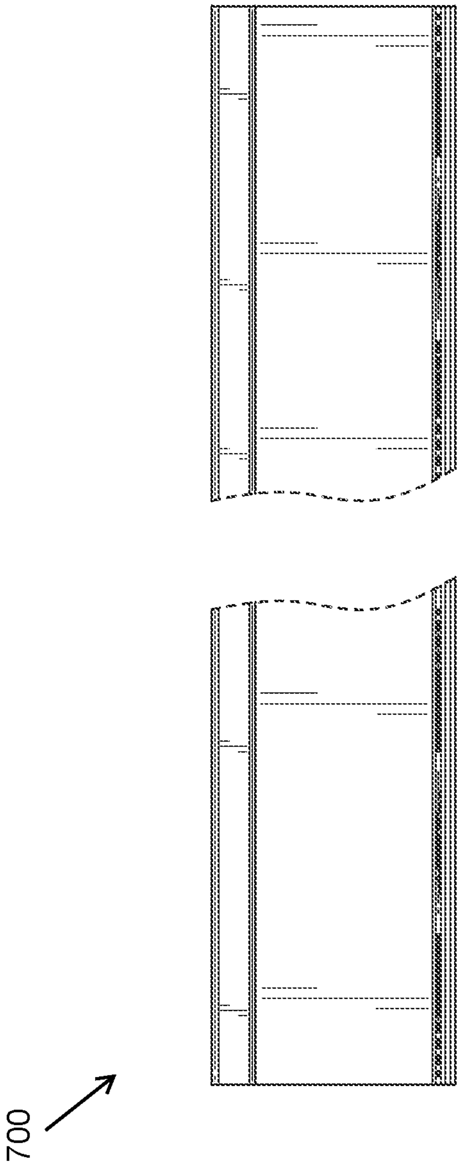
Figure 36:
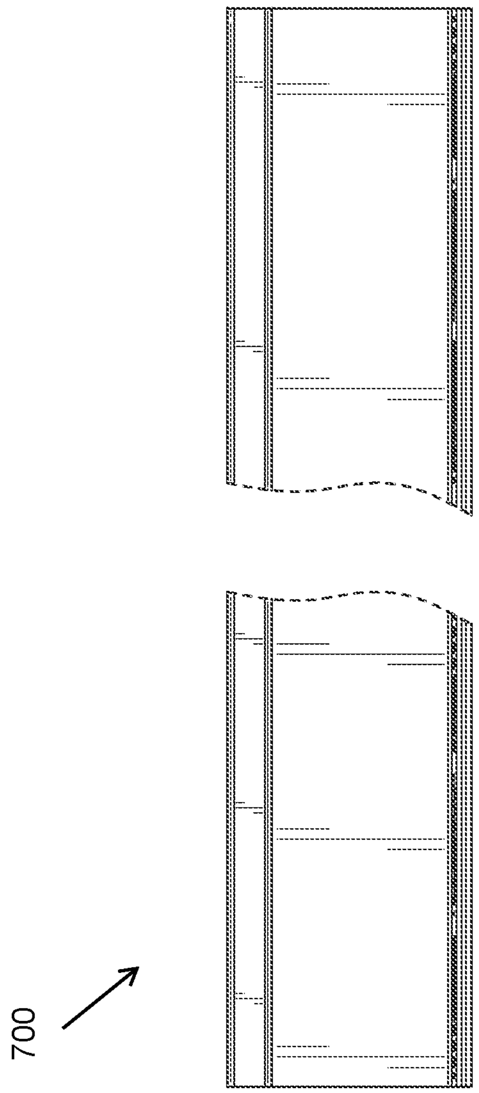
Figure 37:
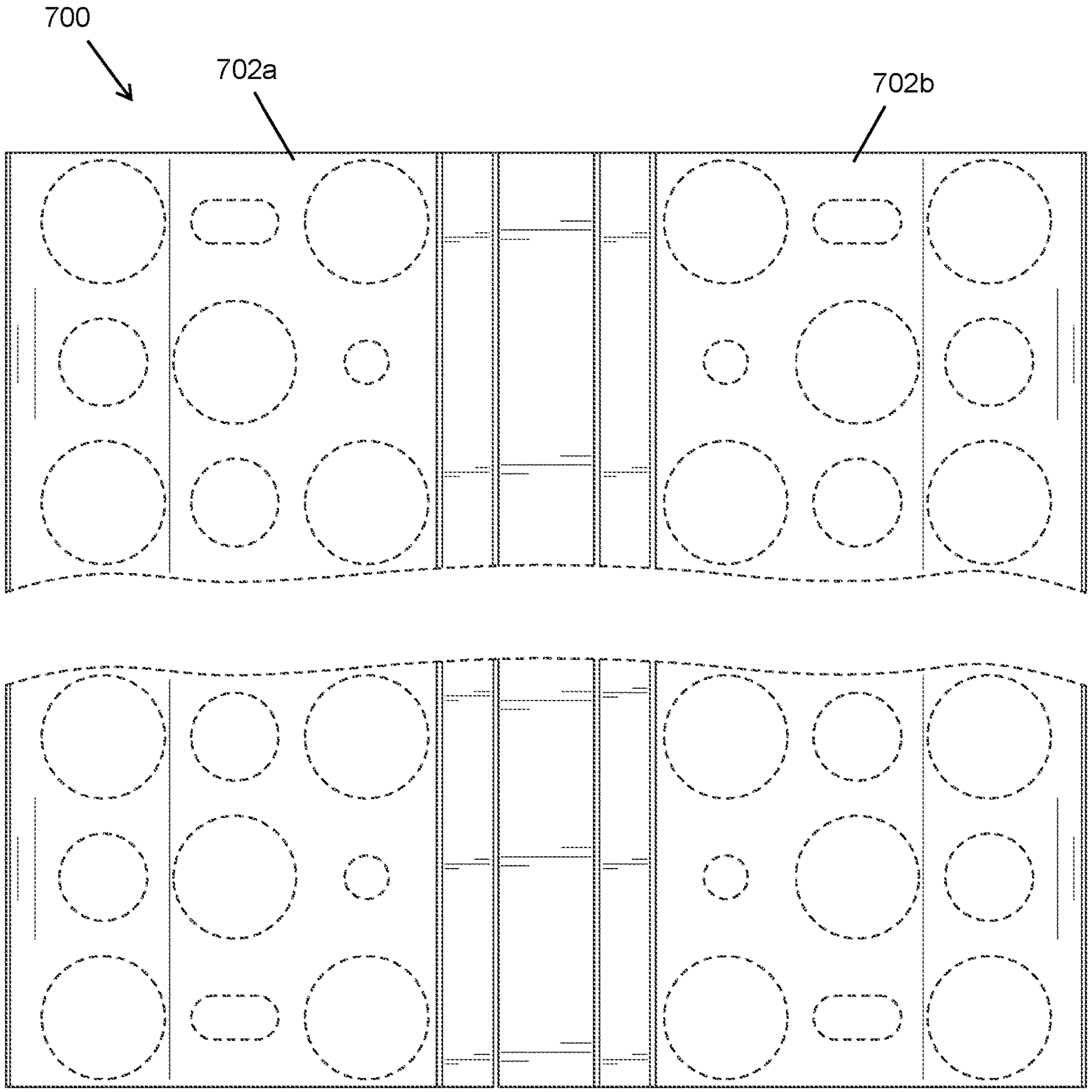
Figure 38:
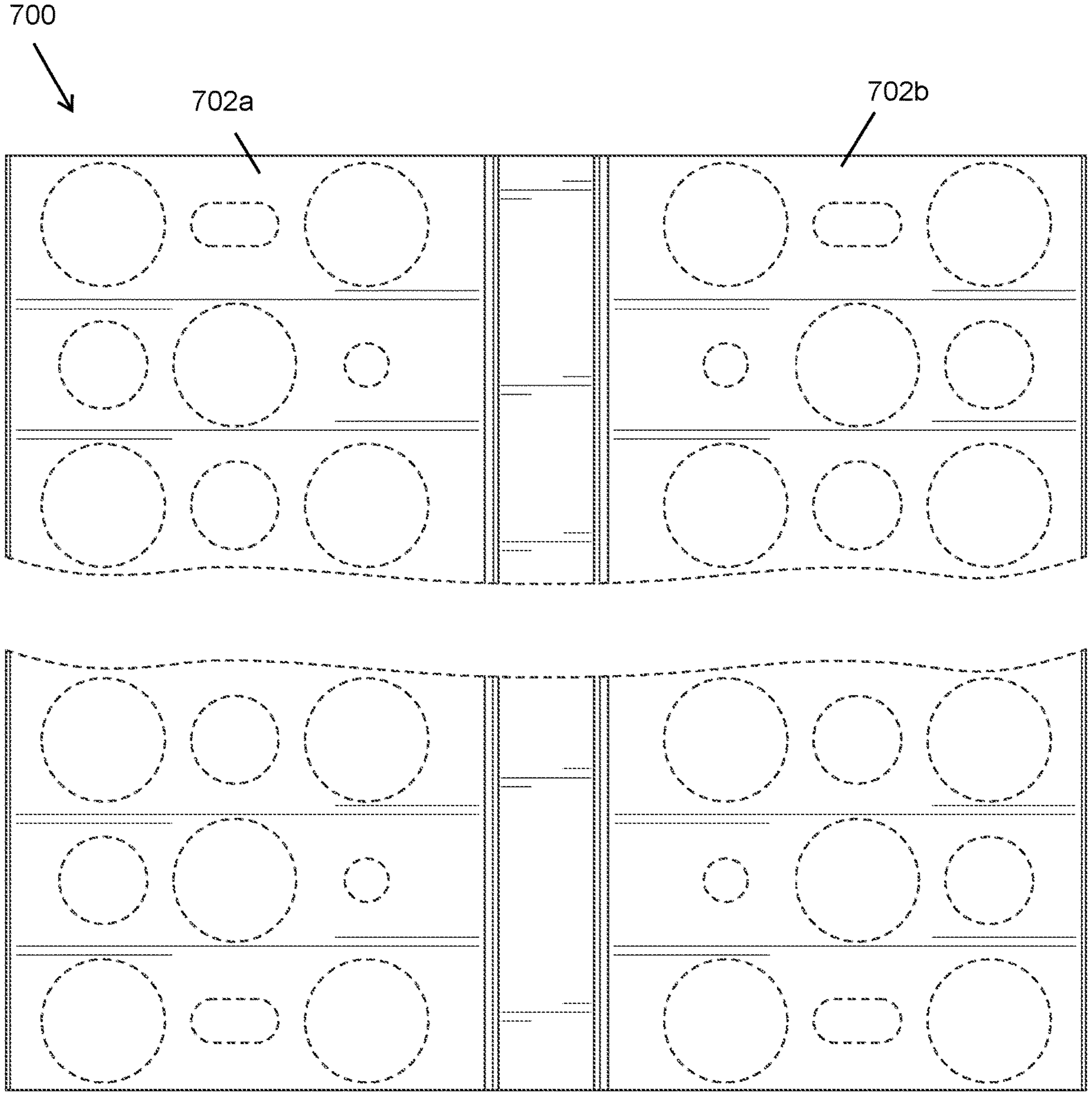

Optionally, the stop bead walls are spaced from one another by a spacing member 710 joined between the stop bead walls and configured to receive a sealant or caulk at an upper surface, similar to the spacing members described herein. The spacing member 710 may comprise a first support arm 714 extending between the first stop bead wall 703 and the second stop bead wall 705 and a second support arm 716 extending between the first stop bead wall 703 and the second stop bead wall 705 parallel to and spaced from the first support arm 714 along the stop bead walls. The spacing member 710 may be integrally formed with or attached to both stop bead walls. Optionally, and such as shown in FIGS. 33 and 34, the spacing member 710 may be integrally formed with one stop bead wall and may attach to the other stop bead wall via an adhesive member 718. The spacing member 710 may include a flexible outer surface or wall 712 (e.g., a concave outer wall) that engages one of the stop bead walls and flexes toward the other one of the stop bead walls. Thus, the spacing member 710 may be configured to allow the respective stop bead walls to flex or move relative to one another, such as due to expansion and retraction of the respective wall surfaces received at the first and second stop bead walls.

As shown, the spacing member 710 may include a lip or tab or fin or extension 726 extending from the wall or upper support arm at one end of the spacing member 710 and engaging or connected to one of the stop bead walls. In the illustrated example of FIGS. 33-38, the fin 726 extends from the upper support arm 714 and engages a side of the first stop bead wall 703 facing the second stop bead wall 705. The fin 726 provides an environmental barrier for the adhesive member 718 connecting the spacing member 710 to the first stop bead wall 703 and allows the stop bead wall 703 to compress or flex toward the fin 726 during expansion of the wall material received at the first portion 702*a* of the base panel. Thus, the casing joint provides a flexible seam between adjacent portions or sections of wall that allows the sections to expand and retract relative to one another while maintaining a uniform seam or edge thereat.

For illustrative purposes, the stop bead is discussed in conjunction with a jamb of a window unit or door unit. However, the stop bead may be used to separate wall surface material from any material dissimilar from the wall surface material, such as where plaster or stucco is to be separated from soffits, capping, or siding. As used herein, a jamb is part of a frame that frames an opening in a wall. Further, as used herein, a jamb includes a structure, such as soffits, capping, or siding, which is to be separated from wall surface material with a stop bead.

As discussed above, a casing bead disposed at a jamb (such as a window or door jamb) or an edge of a vertical wall structure provides a terminal edge for finishing material of the wall, such as stucco, plaster, vinyl, manufactured stone, or the like. However, moisture or vapor may become trapped interior the wall (i.e., behind the finishing material) and the terminal edge may not allow the moisture or vapor to escape the wall. A ventilation screed (such as a ventilation screed utilizing features of the ventilation screeds of U.S. Pat. No. 11,180,913, which is hereby incorporated herein by reference in its entirety) may be used in conjunction with a casing bead to provide a terminal edge of the finishing material and a ventilation pathway for moisture to escape the wall. Ventilation screeds can be installed at or over a drainage plane (such as a rain screen) attached at the backing wall (such as plywood), and behind finishing layers of the vertical wall structure, such as galvanized wire or lathe and stucco or plaster.

A ventilation screed may be disposed along an upper edge of a vertical wall structure behind finishing material of the vertical wall structure and configured to provide a ventilation pathway for moisture to escape from behind the finishing material upward along the vertical wall structure and exterior the vertical wall structure through the ventilation screed. For example, the ventilation screed may include an attachment flange that is disposed along the vertical wall structure (e.g., attached to a rain screen disposed along the backing wall) and configured to receive the finishing wall material over the attachment flange. A ventilation structure may extend from an upper end of the attachment flange and away from the vertical wall structure, where the ventilation structure has a hollow construction and at least one aperture formed therethrough to allow moisture to escape the vertical wall structure to the ventilation structure and drain or vent out of the ventilation structure through the at least one aperture. A lower surface or portion of the ventilation structure facing the attachment flange may receive the finishing material of the wall to provide the clean edge of the finishing material. An upper surface or portion of the ventilation structure may face and/or be disposed against an upper horizontal structure that is generally horizontal relative to the vertical wall structure, such as a soffit or ceiling or overhang or roof.

A spacing member, similar to the spacing members described herein, may be disposed along the upper surface or portion of the ventilation structure of the ventilation screed. Thus, when the ventilation screed is attached at the upper end of the vertical wall structure at or near the horizontal structure, the spacing member engages the horizontal structure. The spacing member may include a flexible outer surface or wall (such as a convex or concave outer surface or wall) that flexes relative to the ventilation structure of the ventilation screed to accommodate movement of the vertical wall and horizontal structure relative to one another, such as due to thermal expansion and contraction. An adhesive member may be disposed along the outer surface of the spacing member to attach the ventilation screed to the horizontal structure.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A casing bead, the casing bead comprising:

a base panel that, with the casing bead mounted at a vertical wall structure, is disposed along the vertical wall structure;

a stop bead wall extending from an edge region of the base panel, wherein the stop bead wall comprises a first side facing the base panel, a second side opposite the first side, and a flange extending from the first side of the stop bead wall and at least partially over the base panel;

a flexible spacing element disposed at the second side of the stop bead wall;

wherein the flexible spacing element comprises a surface spaced from the second side of the stop bead wall by a pair of side walls of the flexible spacing element;

wherein the surface of the flexible spacing element includes a partially convex surface including a central convex bulb portion and first and second flat surface portions that extend laterally from opposing ends of the central convex bulb portion;

an adhesive element disposed at the surface of the flexible spacing element;

wherein, with the casing bead mounted at the vertical wall structure, the adhesive element engages a structure adjacent to the vertical wall structure to adhesively attach the casing bead at the structure;

wherein, with the casing bead attached at the structure, the flexible spacing element is disposed between the stop bead wall and the structure; and wherein, with the casing bead attached at the structure and in response to an expansion of the structure, the flexible spacing element is compressed toward the stop bead wall.

2. The casing bead of claim 1, wherein a fin extends from the surface of the flexible spacing element and adjacent to the adhesive element so that, with the casing bead attached at the structure, the adhesive element engages the structure and is disposed between the vertical wall structure and the fin.

3. The casing bead of claim 1, wherein the flange comprises a biasing portion at an end of the flange distal from the stop bead wall and extending from the flange toward the base panel, and wherein the biasing portion, when a rigid wall surface material is disposed between the flange and the base panel, engages the rigid wall surface material and biases the rigid wall surface material toward the base panel to retain the rigid wall surface material at the casing bead.

4. The casing bead of claim 3, wherein the biasing portion comprises a U-shaped extension or a V-shaped extension at the end of the flange.

5. The casing bead of claim 1, wherein the flange extends from a distal end of the stop bead wall distal from the base panel.

6. The casing bead of claim 1, wherein the flexible spacing element comprises one selected from the group consisting of (i) a flexible vinyl material, (ii) a stiff vinyl material, (iii), a rubber material, (iv) a foam material and (v) a flexible metallic material.

7. The casing bead of claim 1, wherein the pair of side walls of the flexible spacing element comprises a first side wall at the second side of the stop bead wall and a second side wall at the second side of the stop bead wall and spaced from the first side wall, and wherein the first side wall comprises a first thickness and the second side wall comprises a second thickness different from the first thickness.

8. The casing bead of claim 7, wherein the second thickness is less than the first thickness, and wherein, when the flexible spacing element is compressed toward the stop bead wall, the spacing element flexes at the second side wall.

9. The casing bead of claim 1, wherein the pair of side walls of the flexible spacing element comprises a first side wall extending from the first flat surface portion and a second side wall extending from the second flat surface portion.

10. The casing bead of claim 1, wherein the adhesive element comprises double sided tape disposed at the surface of the flexible spacing element.

11. The casing bead of claim 1, wherein the flange extends partially over a first side of the base panel, and wherein a second adhesive element is disposed at a second side of the base panel that is opposite the first side of the base panel.

12. A casing joint, the casing joint comprising:

a first base panel that, with the casing joint mounted at a vertical wall structure, is disposed along a first portion of the vertical wall structure;

a second base panel that, with the casing joint mounted at the vertical wall structure, is disposed along a second portion of the vertical wall structure adjacent the first portion;

a first stop bead wall extending from an edge region of the first base panel, wherein the first stop bead wall comprises a first side facing the first base panel, a second side opposite the first side, and a flange extending from the first side of the first stop bead wall and at least partially over the first base panel;

a second stop bead wall extending from an edge region of the second base panel, wherein the second stop bead wall comprises a first side facing the second base panel, a second side opposite the first side and a flange extending from the first side of the second stop bead wall and at least partially over the second base panel;

a flexible spacing element disposed between the second side of the first stop bead wall and the second side of the second stop bead wall, wherein the first stop bead wall and the second stop bead wall are spaced from one another by the flexible spacing element;

wherein the flexible spacing element comprises a surface spaced from the second side of the first stop bead wall by a pair of side walls of the flexible spacing element;

wherein the surface of the flexible spacing element includes a partially convex surface including a central convex bulb portion and first and second flat surface portions that extend laterally from opposing ends of the central convex bulb portion;

wherein, with the casing joint mounted at the vertical wall structure, the first base panel and the first stop bead wall receive a surface material of the first portion of the vertical wall structure and the second base panel and the second stop bead wall receive a surface material of the second portion of the vertical wall structure; and wherein, with the casing joint mounted at the vertical wall structure and in response to an expansion of the surface material of the first portion of the vertical wall structure and the surface material of the second portion of the vertical wall structure, the flexible spacing element is compressed between the first stop bead wall and the second stop bead wall.

13. The casing joint of claim 12, wherein an adhesive element is disposed at least at one of (i) a side of the first base panel that, with the casing joint mounted at the vertical wall structure, faces the first portion of the vertical wall structure and (ii) a side of the second base panel that, with the casing joint mounted at the vertical wall structure, faces the second portion of the vertical wall structure, and wherein the adhesive element, with the casing joint mounted at the vertical wall structure, engages the vertical wall structure to adhesively attach the casing joint at the vertical wall structure.

14. The casing joint of claim 12, wherein the surface is disposed adjacent the second side of the second stop bead wall.

15. The casing joint of claim 14, wherein, when the flexible spacing element is compressed between the first stop bead wall and the second stop bead wall, the flexible spacing element flexes toward the second side of the first stop bead wall.

16. The casing joint of claim 14, wherein a fin extends from the surface of the flexible spacing element and between the surface of the flexible spacing element and the second side of the second stop bead wall.

17. A casing bead, the casing bead comprising:

a base panel that, with the casing bead mounted at a vertical wall structure, is disposed along the vertical wall structure;

a stop bead wall extending from an edge region of the base panel, wherein the stop bead wall comprises a first side facing the base panel, a second side opposite the first side, and a flange extending from the first side of the stop bead wall and at least partially over the base panel;

wherein the flange comprises a biasing portion at an end of the flange distal from the stop bead wall and extending from the flange toward the base panel;

wherein the biasing portion, when a rigid wall surface material is disposed between the flange and the base panel, engages the rigid wall surface material and biases the rigid wall surface material toward the base panel to retain the rigid wall surface material at the casing bead;

a flexible spacing element disposed at the second side of the stop bead wall;

wherein the flexible spacing element comprises a surface spaced from the second side of the stop bead wall by a pair of side walls of the flexible spacing element;

wherein the surface of the flexible spacing element includes a partially convex surface including a central convex bulb portion and first and second flat surface portions that extend laterally from opposing ends of the central convex bulb portion;

an adhesive element disposed at the surface of the flexible spacing element;

wherein, with the casing bead mounted at the vertical wall structure, the adhesive element engages a structure adjacent to the vertical wall structure to adhesively attach the casing bead at the structure;

wherein, with the casing bead attached at the structure, the flexible spacing element is disposed between the stop bead wall and the structure; and wherein, with the casing bead attached at the structure and in response to an expansion of the structure, the flexible spacing element is compressed toward the stop bead wall.

18. The casing bead of claim 17, wherein a fin extends from the surface of the flexible spacing element and adjacent to the adhesive element so that, with the casing bead attached at the structure, the adhesive element engages the structure and is disposed between the vertical wall structure and the fin.

19. The casing bead of claim 17, wherein the biasing portion comprises a U-shaped extension or a V-shaped extension at the end of the flange.

20. The casing bead of claim 17, wherein the flange extends from a distal end of the stop bead wall distal from the base panel.

21. The casing bead of claim 17, wherein the pair of side walls of the flexible spacing element comprises a first side wall at the second side of the stop bead wall and a second side wall at the second side of the stop bead wall and spaced from the first side wall, and wherein the first side wall comprises a first thickness and the second side wall comprises a second thickness different from the first thickness.

22. The casing bead of claim 21, wherein the second thickness is less than the first thickness, and wherein, when the flexible spacing element is compressed toward the stop bead wall, the spacing element flexes at the second side wall.

23. The casing bead of claim 17, wherein the flange extends partially over a first side of the base panel, and wherein a second adhesive element is disposed at a second side of the base panel that is opposite the first side of the base panel.

* * * * *